US012127189B2

(12) United States Patent
Wu et al.

(10) Patent No.: US 12,127,189 B2
(45) Date of Patent: Oct. 22, 2024

(54) METHOD AND DEVICE IN A NODE USED FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/510,673

(22) Filed: Nov. 16, 2023

(65) Prior Publication Data
US 2024/0098732 A1    Mar. 21, 2024

Related U.S. Application Data

(63) Continuation of application No. 17/361,328, filed on Jun. 29, 2021, now Pat. No. 11,864,174, which is a
(Continued)

(30) Foreign Application Priority Data

Jan. 19, 2020    (CN) .......................... 202010060755.6

(51) Int. Cl.
*H04W 72/1263*    (2023.01)
*H04L 5/00*    (2006.01)
(Continued)

(52) U.S. Cl.
CPC ....... *H04W 72/1263* (2013.01); *H04L 5/0051* (2013.01); *H04W 72/046* (2013.01); *H04W 72/535* (2023.01)

(58) Field of Classification Search
CPC ... H04W 72/535; H04W 72/54; H04W 72/53; H04W 72/52; H04W 72/51; H04W 72/50;
(Continued)

(56) References Cited

U.S. PATENT DOCUMENTS

2021/0184812 A1*   6/2021   MolavianJazi ....... H04L 1/0041

FOREIGN PATENT DOCUMENTS

| CN | 108111276 A |   | 6/2018 | |
| CN | 110460360 | * | 11/2019 | ........... H04B 7/0456 |

(Continued)

OTHER PUBLICATIONS

CN202010060755.6 Notification to Grant Patent Right for Invention dated Jun. 1, 2022.
(Continued)

*Primary Examiner* — Phong La

(57) ABSTRACT

The present disclosure provides a method and device in a node for wireless communications. A first node receives a first signaling; and operates a first signal group. The first signaling is used for determining a first reference-signal-resource set; a first parameter-group set comprises a positive integer number of parameter group(s), any parameter group in the first parameter-group set is used for the operating action of a signal in the first signal group; any reference signal resource in the first reference-signal-resource set is used for determining a parameter group in the first parameter-group set. The above method unifies beam management mechanisms for both Uplink and Downlink, which improves performance of Uplink transmission and reduces corresponding signaling overhead and delay.

20 Claims, 5 Drawing Sheets

Related U.S. Application Data continuation of application No. PCT/CN2021/071045, filed on Jan. 11, 2021.

(51) Int. Cl.
*H04W 72/044* (2023.01)
*H04W 72/50* (2023.01)

(58) Field of Classification Search
CPC .............. H04W 72/1263; H04W 72/12; H04W 72/121; H04W 72/1221; H04W 72/046; H04W 72/0466; H04W 72/0473; H04W 72/0446; H04W 72/044; H04L 5/0051; H04L 5/005; H04L 5/48
See application file for complete search history.

(56) References Cited

FOREIGN PATENT DOCUMENTS

| | | | |
|---|---|---|---|
| CN | 110460360 A | 11/2019 | |
| CN | 110662294 A | 1/2020 | |
| WO | 2019127199 A1 | 7/2019 | |
| WO | WO 2019127199 | * 7/2019 | ............ H04W 72/23 |

OTHER PUBLICATIONS

CN202010060755.6 First Office Action dated Jan. 6, 2022.
CN202010060755.6 First Search Report dated Dec. 26, 2021.
First Office Action of Chinese patent application No. CN202210773555.4 dated Dec. 29, 2023.
Notification to Grant Patent Right for Invention of Chinese patent application No. CN202010060755.6 dated Jun. 1, 2022.

* cited by examiner

Any parameter group in first parameter group set —used for→ operating action of a signal in first signal group

FIG. 6

Any reference signal resource in first reference-signal-resource set —used for determining→ a parameter group in first parameter group set

FIG. 7

Given reference signal resource —used for determining→ given parameter group —used for→ reception of given signal

FIG. 8

Given reference signal resource —used for determining→ given parameter group —used for→ transmission of given signal

FIG. 9

Which candidate parameter(s) comprised in any parameter group in first parameter group set ←related to→ whether operating action is receiving or transmitting

FIG. 10

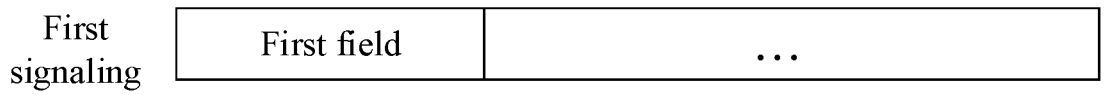

FIG. 11

Any reference signal resource in first reference-signal-resource set ←corresponding to→ an associated type in first associated type set

FIG. 12

Which candidate parameter(s) comprised in target parameter group ←related to→ { target associated type, whether operating action is receiving or transmitting }

FIG. 13

METHOD AND DEVICE IN A NODE USED FOR WIRELESS COMMUNICATION

CROSS REFERENCE TO RELATED APPLICATIONS

This application is a continuation of the U.S. patent application Ser. No. 17/361,328, filed on Jun. 29, 2021, which is a continuation of International Application No. PCT/CN2021/071045, filed Jan. 11, 2021, claims the priority benefit of Chinese Patent Application No. 202010060755.6, filed on Jan. 19, 2020, the full disclosure of which is incorporated herein by reference.

BACKGROUND

Technical Field

The present disclosure relates to transmission methods and devices in wireless communication systems, and in particular to a method and device of radio signal transmission in a wireless communication system that supports cellular networks.

Related Art

Multi-antenna is a key technique in both 3rd Generation Partner Project (3GPP) Long-term Evolution (LTE) and New Radio (NR) systems. By configuring multiple antennas at a communication node, for instance, at a base station or a User Equipment (UE) to acquire extra spatial degrees of freedom. The multiple antennas form through beamforming a beam pointing in a specific direction to improve communication quality. When the multiple antennas belong to multiple Transmitter Receiver Points (TRPs)/panels, the spatial differences among these TRPs/panels can be utilized to get extra diversity gains. Since the beam formed through beamforming of multiple antennas is usually narrow, beams from both sides of communication shall be aligned to enable effective communication. When UE mobility or other factors lead to the out-of-step of a transmission/reception beam, the communications will face a large decline in quality or even communication failure. So, beam management is proposed in NR Release (R) 15 and R16 for beam selection and updating between two communication sides, thus achieving performance gains brought by multiple antennas.

SUMMARY

Inventors find through researches that in NR R15 and R16, mechanisms employed for uplink beam management and downlink beam management are different, which increases the system complexity and has a negative impact on signaling overhead and delay, and the performance of uplink transmission will be constrained due to such a difference. Therefore, how to enhance Uplink beam management mechanism to improve performance of Uplink transmission is a problem to be solved.

To address the above problem, the present disclosure provides a solution. It should be noted that though the present disclosure only takes the cellular communication scenario for example in the statement above, it is also applicable to other scenarios such as Sidelink communications where similar technical effect can be achieved; additionally, the adoption of a unified solution for various scenarios (including but not limited to Sidelink communications and cellular communications) contributes to the reduction of hardcore complexity and costs. If no conflict is incurred, embodiments in a first node in the present disclosure and the characteristics of the embodiments are also applicable to a second node, and vice versa. What's more, the embodiments in the present disclosure and the characteristics in the embodiments can be arbitrarily combined if there is no conflict.

The present disclosure provides a method in a first node for wireless communications, comprising:
receiving a first signaling; and
operating a first signal group;
herein, the first signal group comprises a positive integer number of signal(s); the first signaling comprises scheduling information of the first signal group; the first signaling is used for determining a first reference-signal-resource set; a first parameter-group set comprises a positive integer number of parameter group(s), any parameter group in the first parameter-group set is used for the operating action of a signal in the first signal group; any reference signal resource in the first reference-signal-resource set is used for determining a parameter group in the first parameter-group set; any parameter group in the first parameter-group set comprises one or more types of K types of candidate parameters, K being a positive integer greater than 1; the operating action is receiving or transmitting; which type(s) of the K types of candidate parameters comprised by any parameter group in the first parameter-group set is related to whether the operating action is receiving or transmitting.

In one embodiment, a problem to be solved in the present disclosure is how to enhance Uplink beam management. The above method solves this problem by unifying Uplink beam management mechanism and Downlink beam management mechanism.

In one embodiment, the above method is characterized in that the first reference-signal-resource set is used for determining a transmission or reception parameter of the first signal.

In one embodiment, the above method is advantageous in that the enhancement of Uplink beam management mechanism enables more flexible and efficient control on transmission parameters of Uplink transmission, thus improving performance of Uplink transmission.

In one embodiment, the above method is advantageous in that Uplink and Downlink beam management mechanisms are unified, thus reducing corresponding signaling overhead and delay.

In one embodiment, the above method is advantageous in that for UE configured with multiple panels, the above method supports an efficient dynamic panel selection, improving performance of Uplink transmission.

According to one aspect of the present disclosure, wherein a first associated type set comprises a positive integer number of associated type(s); any reference signal resource in the first reference-signal-resource set corresponds to one associated type in the first associated type set; a target reference signal resource is any reference signal resource in the first reference-signal-resource set; the target reference signal resource is used for determining a target parameter group in the first parameter-group set, and the target reference signal resource corresponds to a target associated type in the first associated type set; which type(s) of the K types of candidate parameters comprised by the target parameter group is related to the target associated type.

According to one aspect of the present disclosure, wherein the first signaling is used for determining M reference signal resources, M being a positive integer greater than 1; the first reference-signal-resource set is a subset of the M reference signal resources; and the first reference-signal-resource set is related to whether the operating action is receiving or transmitting.

According to one aspect of the present disclosure, wherein the first signaling is used for determining a first information unit, and the first information unit indicates the M reference signal resources and M first-type parameters; the M reference signal resources respectively correspond to the M first-type parameters; whether the operating action is receiving or transmitting and the M first-type parameters are used together for determining the first reference-signal-resource set out of the M reference signal resources.

According to one aspect of the present disclosure, wherein the first signaling is used for determining a second information unit and a third information unit; the second information unit indicates a second reference-signal-resource subset, and the third information unit indicates a third reference-signal-resource subset; the M reference signal resources comprise the second reference-signal-resource subset and the third reference-signal-resource subset; whether the first reference-signal-resource set comprises reference signal resource(s) in one or both of the second reference-signal-resource subset and the third reference-signal-resource subset is related to the whether the operating action is receiving or transmitting.

According to one aspect of the present disclosure, wherein when the operating action is transmitting, the first reference-signal-resource set comprises reference signal resource(s) in only a target reference-signal-resource subset in the second reference-signal-resource subset and the third reference-signal-resource subset.

According to one aspect of the present disclosure, comprising:
receiving a first information block;
herein, the first information block is used for activating N2 information units out of N1 information units, N1 and N2 are respectively positive integers greater than 1, and N2 is no greater than N1; any of the N2 information units indicates a positive integer number of reference signal resource(s), and any reference signal resource in the first reference-signal-resource set is a reference signal resource indicated by one of the N2 information units.

According to one aspect of the present disclosure, wherein the first node is a UE.

According to one aspect of the present disclosure, wherein the first node is a relay node.

The present disclosure provides a method in a second node for wireless communications, comprising:
transmitting a first signaling; and
executing a first signal group;
herein, the first signal group comprises a positive integer number of signal(s); the first signaling comprises scheduling information of the first signal group; the first signaling is used for determining a first reference-signal-resource set; a first parameter-group set comprises a positive integer number of parameter group(s), any parameter group in the first parameter-group set is used for an operating action of a signal in the first signal group; the executing action is receiving or transmitting; when the executing action is receiving, the operating action is transmitting; when the executing action is transmitting, the operating action is receiving; any reference signal resource in the first reference-signal-resource set is used for determining a parameter group in the first parameter-group set; any parameter group in the first parameter-group set comprises one or more types of K types of candidate parameters, K being a positive integer greater than 1; which type(s) of the K types of candidate parameters comprised by any parameter group in the first parameter-group set is related to whether the operating action is receiving or transmitting.

According to one aspect of the present disclosure, wherein a first associated type set comprises a positive integer number of associated type(s); any reference signal resource in the first reference-signal-resource set corresponds to one associated type in the first associated type set; a target reference signal resource is any reference signal resource in the first reference-signal-resource set; the target reference signal resource is used for determining a target parameter group in the first parameter-group set, and the target reference signal resource corresponds to a target associated type in the first associated type set; which type(s) of the K types of candidate parameters comprised by the target parameter group is related to the target associated type.

According to one aspect of the present disclosure, wherein the first signaling is used for determining M reference signal resources, M being a positive integer greater than 1; the first reference-signal-resource set is a subset of the M reference signal resources; and the first reference-signal-resource set is related to whether the operating action is receiving or transmitting.

According to one aspect of the present disclosure, wherein the first signaling is used for determining a first information unit, and the first information unit indicates the M reference signal resources and M first-type parameters; the M reference signal resources respectively correspond to the M first-type parameters; whether the operating action is receiving or transmitting and the M first-type parameters are used together for determining the first reference-signal-resource set out of the M reference signal resources.

According to one aspect of the present disclosure, wherein the first signaling is used for determining a second information unit and a third information unit; the second information unit indicates a second reference-signal-resource subset, and the third information unit indicates a third reference-signal-resource subset; the M reference signal resources comprise the second reference-signal-resource subset and the third reference-signal-resource subset; whether the first reference-signal-resource set comprises reference signal resource(s) in one or both of the second reference-signal-resource subset and the third reference-signal-resource subset is related to the whether the operating action is receiving or transmitting.

According to one aspect of the present disclosure, wherein when the operating action is transmitting, the first reference-signal-resource set comprises reference signal resource(s) in only a target reference-signal-resource subset in the second reference-signal-resource subset and the third reference-signal-resource subset.

According to one aspect of the present disclosure, comprising:
transmitting a first information block;
herein, the first information block is used for activating N2 information units out of N1 information units, N1 and N2 are respectively positive integers greater than 1, and N2 is no greater than N1; any of the N2 information units indicates a positive integer number of reference signal resource(s), and any reference signal resource in the first reference-signal-resource set is a reference signal resource indicated by one of the N2 information units.

According to one aspect of the present disclosure, wherein the second node is a base station.

According to one aspect of the present disclosure, wherein the second node is a UE.

According to one aspect of the present disclosure, wherein the second node is a relay node.

The present disclosure provides a first node for wireless communication, comprising:
- a first receiver, receiving a first signaling; and
- a first processor, operating a first signal group;
- herein, the first signal group comprises a positive integer number of signal(s); the first signaling comprises scheduling information of the first signal group; the first signaling is used for determining a first reference-signal-resource set; a first parameter-group set comprises a positive integer number of parameter group(s), any parameter group in the first parameter-group set is used for the operating action of a signal in the first signal group; any reference signal resource in the first reference-signal-resource set is used for determining a parameter group in the first parameter-group set; any parameter group in the first parameter-group set comprises one or more types of K types of candidate parameters, K being a positive integer greater than 1; the operating action is receiving or transmitting; which type(s) of the K types of candidate parameters comprised by any parameter group in the first parameter-group set is related to whether the operating action is receiving or transmitting.

The present disclosure provides a second node for wireless communications, comprising:
- a first transmitter, transmitting a first signaling; and
- a second processor, executing a first signal group;
- herein, the first signal group comprises a positive integer number of signal(s); the first signaling comprises scheduling information of the first signal group; the first signaling is used for determining a first reference-signal-resource set; a first parameter-group set comprises a positive integer number of parameter group(s), any parameter group in the first parameter-group set is used for an operating action of a signal in the first signal group; the executing action is receiving or transmitting; when the executing action is receiving, the operating action is transmitting; when the executing action is transmitting, the operating action is receiving; any reference signal resource in the first reference-signal-resource set is used for determining a parameter group in the first parameter-group set; any parameter group in the first parameter-group set comprises one or more types of K types of candidate parameters, K being a positive integer greater than 1; which type(s) of the K types of candidate parameters comprised by any parameter group in the first parameter-group set is related to whether the operating action is receiving or transmitting.

In one embodiment, the present disclosure has the following advantages over conventional schemes:
the enhancement of Uplink beam management mechanism enables more flexible and efficient control on transmission parameters of Uplink transmission, thus improving performance of Uplink transmission.

Uplink and Downlink beam management mechanisms are unified, thus reducing corresponding signaling overhead and delay.

for UE configured with multiple panels, a flexible and efficient dynamic panel selection is supported.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of any parameter group in a first parameter-group set used for an operating action of a signal in a first signal group according to one embodiment of the present disclosure.

FIG. 7 illustrates a schematic diagram of any reference signal resource in a first reference-signal-resource set used for determining a parameter group in a first parameter-group set according to one embodiment of the present disclosure.

FIG. 8 illustrates a schematic diagram of relations among a given parameter group, a given signal and a given reference signal resource according to one embodiment of the present disclosure.

FIG. 9 illustrates a schematic diagram of relations among a given parameter group, a given signal and a given reference signal resource according to one embodiment of the present disclosure.

FIG. 10 illustrates a schematic diagram of which type(s) of K types of candidate parameters comprised by any parameter group in the first parameter-group set being related to whether an operating action is receiving or transmitting according to one embodiment of the present disclosure.

FIG. 11 illustrates a schematic diagram of a first signaling according to one embodiment of the present disclosure.

FIG. 12 illustrates a schematic diagram of a relation between a first associated type set and a first reference-signal-resource set according to one embodiment of the present disclosure.

FIG. 13 illustrates a schematic diagram of a relation between a target parameter group and a target associated type according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
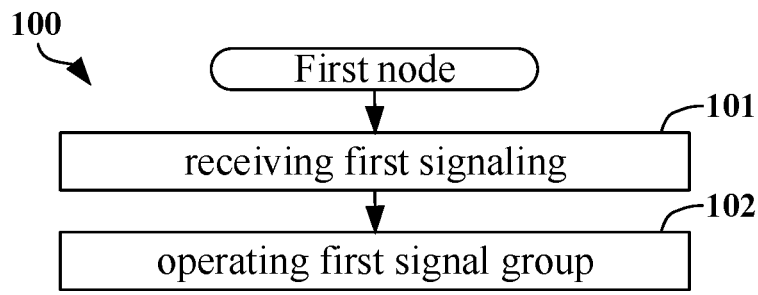
FIG. 1 illustrates a flowchart of a first signaling and a first signal group according to one embodiment of the present disclosure.

Embodiment 1 illustrates a flowchart of a first signaling and a first signal according to one embodiment of the present disclosure, as shown in FIG. 1. In step 100 illustrated by FIG. 1, each box represents a step. Particularly, the sequential order of steps in these boxes does not necessarily mean that the steps are chronologically arranged.

In Embodiment 1, the first node in the present disclosure receives a first signaling in step 101; and operates a first signal group in step 102. Herein, the first signal group comprises a positive integer number of signal(s); the first signaling comprises scheduling information of the first signal group; the first signaling is used for determining a first reference-signal-resource set; a first parameter-group set comprises a positive integer number of parameter group(s), any parameter group in the first parameter-group set is used for the operating action of a signal in the first signal group; any reference signal resource in the first reference-signal-resource set is used for determining a parameter group in the first parameter-group set; any parameter group in the first parameter-group set comprises one or more types of K types of candidate parameters, K being a positive integer greater than 1; the operating action is receiving or transmitting; which type(s) of the K types of candidate parameters comprised by any parameter group in the first parameter-group set is related to whether the operating action is receiving or transmitting.

In one embodiment, the first signaling is a dynamic signaling.

In one embodiment, the first signaling is a layer 1 (L1) signaling.

In one embodiment, the first signaling is a L1 control signaling.

In one embodiment, the first signaling comprises Downlink Control Information (DCI).

In one embodiment, the first signaling comprises one or more fields in a piece of DCI.

In one embodiment, the first signaling comprises Sidelink Control Information (SCI).

In one embodiment, the first signaling comprises one or more fields in a piece of SCI.

In one embodiment, the first signaling is transmitted on a DownLink.

In one embodiment, the first signaling is transmitted on a SideLink.

In one embodiment, when the operating action is receiving, the first signaling comprises DCI used for DownLink Grant, and when the operating action is transmitting, the first signaling comprises DCI used for UpLink Grant.

In one embodiment, any signal in the first signal group is a radio signal.

In one embodiment, any signal in the first signal group is a baseband signal.

In one embodiment, any signal in the first signal group is a Radio Frequency (RF) signal.

In one embodiment, the first signal group is transmitted on a Downlink.

In one embodiment, the first signal group is transmitted on an Uplink.

In one embodiment, the first signal group is transmitted on a SideLink.

In one embodiment, any signal in the first signal group carries a first bit block, the first bit block is a Transport Block (TB), a Code Block (CB) or a Code Block Group (CBG).

In one embodiment, the phrase that any signal in the first signal group carries a first bit block comprises that any signal in the first signal group is an output of a bit in the first bit block sequentially through Cyclic Redundancy Check (CRC) Attachment, Segmentation, CB-level CRC Attachment, Channel Coding, Rate Matching, Concatenation, Scrambling, Modulation Mapper, Layer Mapper, Precoding, Resource Element Mapper, multicarrier symbol generation, and Modulation and Upconversion.

In one embodiment, the phrase that any signal in the first signal group carries a first bit block comprises that the first bit block is used for generating any signal in the first signal group.

In one embodiment, the first signaling comprises scheduling information of any signal in the first signal group.

In one embodiment, the scheduling information comprises one or more of occupied time-domain resources, occupied frequency-domain resources, a Modulation and Coding Scheme (MCS), configuration information of DeModulation Reference Signals (DMRS), a Hybrid Automatic Repeat reQuest (HARQ) process number, a Redundancy Version (RV) or a New Data Indicator (NDI).

In one embodiment, the scheduling information comprises one or more of occupied time-domain resources, occupied frequency-domain resources, occupied code-domain resources, a Reference Signal (RS) sequence, a mapping mode, a cyclic shift, an Orthogonal Cover Code (OCC), a Physical Uplink Control CHannel (PUCCH) format or Uplink Control Information (UCI) content.

In one embodiment, the first signal group only comprises one signal.

In one embodiment, the first signal group comprises two signals.

In one subembodiment of the above embodiment, transmission antenna ports of the two signals cannot be assumed to be Quasi Co-Located (QCL).

In one subembodiment of the above embodiment, transmission antenna ports of the two signals cannot be assumed to be QCL with a corresponding QCL type of QCL-typeD.

In one subembodiment of the above embodiment, the two signals respectively carry the first bit block.

In one subembodiment of the above embodiment, the two signals employ a same MCS.

In one subembodiment of the above embodiment, the two signals correspond to a same HARQ process number.

In one subembodiment of the above embodiment, the two signals correspond to a same NDI.

In one subembodiment of the above embodiment, the two signals correspond to a same RV.

In one subembodiment of the above embodiment, the two signals correspond to different RVs.

In one subembodiment of the above embodiment, the two signals correspond to a same time-frequency resource.

In one subembodiment of the above embodiment, the two signals respectively correspond to different DMRS port groups.

In one subembodiment of the above embodiment, the two signals occupy mutually-orthogonal time-frequency resources.

In one subembodiment of the above embodiment, the two signals correspond to a same DMRS port group.

In one embodiment, the first signal group comprises a reference signal.

In one embodiment, the first signal group comprises a Sounding Reference Signal (SRS).

In one embodiment, the first signal group comprises UCI.

In one embodiment, the first signaling indicates the first reference-signal-resource set.

In one embodiment, the first signaling explicitly indicates the first reference-signal-resource set.

In one embodiment, the first signaling implicitly indicates the first reference-signal-resource set.

In one embodiment, the first signaling indicates each reference signal resource in the first reference-signal-resource set.

In one embodiment, the first reference-signal-resource set only comprises a reference signal resource.

In one embodiment, the first reference-signal-resource set comprises multiple reference signal resources.

In one embodiment, the first reference-signal-resource set comprises a Channel State Information Reference Signal (CSI-RS) resource.

In one embodiment, the first reference-signal-resource set comprises a CSI-RS resource set.

In one embodiment, the first reference-signal-resource set comprises an SRS resource.

In one embodiment, the first reference-signal-resource set comprises an SRS resource set.

In one embodiment, the first reference-signal-resource set comprises a Synchronization Signal/physical broadcast channel Block (SSB) resource.

In one embodiment, the first reference-signal-resource set comprises a periodic reference signal resource.

In one embodiment, the first reference-signal-resource set comprises a semi-persistent reference signal resource.

In one embodiment, the first reference-signal-resource set comprises an aperiodic reference signal resource.

In one embodiment, any reference signal resource of the first reference-signal-resource set is one of a CSI-RS resource, a CSI-RS resource set, an SRS resource, an SRS resource set or an SSB resource.

In one embodiment, the first parameter set only comprises one parameter group.

In one embodiment, the first parameter set comprises multiple parameter groups.

In one subembodiment of the above embodiment, there does not exist one type of the K types of candidate parameters belonging to two parameter groups in the multiple parameter groups.

In one subembodiment of the above embodiment, there exists one type of the K types of candidate parameters belonging to two parameter groups in the multiple parameter groups.

In one embodiment, when the operating action is receiving, any parameter group in the first parameter-group set is used for a reception of a signal in the first signal group; and when the operating action is transmitting, any parameter group in the first parameter-group set is used for a transmission of a signal in the first signal group.

In one embodiment, if the operating action is receiving, any parameter group in the first parameter-group set is used for a reception of a signal in the first signal group; and if the operating action is transmitting, any parameter group in the first parameter-group set is used for a transmission of a signal in the first signal group.

In one embodiment, the K types of candidate parameters are predefined.

In one embodiment, the K types of candidate parameters are configured by a higher-layer signaling.

In one embodiment, the K types of candidate parameters comprise large-scale properties.

In one embodiment, the large-scale properties include one or more of delay spread, Doppler spread, Doppler shift, average delay, and Spatial Rx parameters.

In one embodiment, the K types of candidate parameters include delay spread, Doppler spread, Doppler shift, average delay, and Spatial Rx parameters.

In one embodiment, the K types of candidate parameters comprise a spatial domain filter.

In one embodiment, the spatial domain filter comprises a spatial domain transmission filter.

In one embodiment, the spatial domain filter comprises a spatial domain receive filter.

In one embodiment, the K types of candidate parameters comprise pre-coding.

In one embodiment, the K types of candidate parameters comprise a Timing advance (TA).

In one embodiment, the K types of candidate parameters comprise power control parameters.

In one embodiment, the power control parameters include one or more of $P_0(j)$ used for PUSCH power control, $\alpha(j)$ used for PUSCH power control, an identifier of a reference signal resource for measuring pathloss when calculating transmission power of the first signal group, an index of power control adjustment state corresponding to the first signal group and a pathloss employed when calculating transmission power of the first signal group.

In one embodiment, the K types of candidate parameters comprise a Phase-Tracking Reference Signal (PTRS) port.

In one embodiment, the K types of candidate parameters comprise a transmission antenna.

In one embodiment, the K types of candidate parameters comprise a transmission antenna panel.

Embodiment 2

Figure 2:
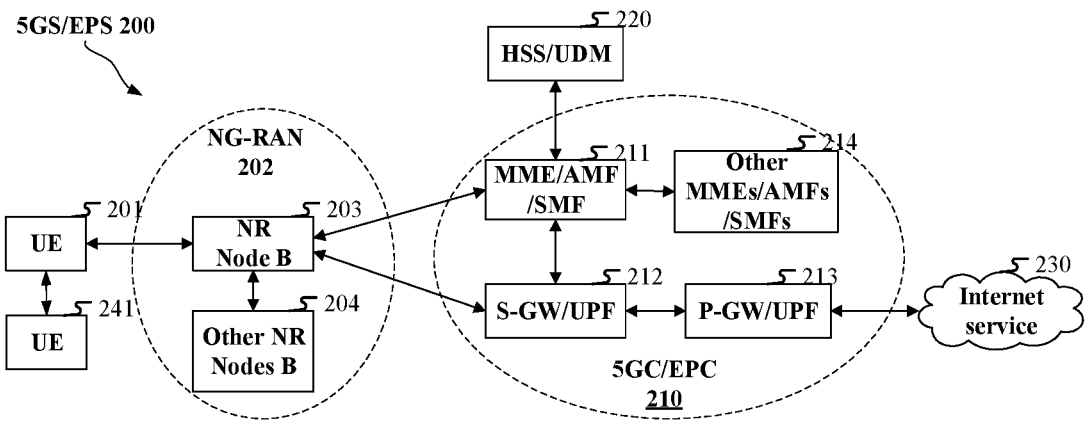
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in Sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure comprises the UE 201.

In one embodiment, the first node in the present disclosure comprises the UE 241.

In one embodiment, the second node in the present disclosure comprises the gNB 203.

In one embodiment, the second node in the present disclosure comprises the UE 241.

In one embodiment, a radio link between the UE 201 and the gNB 203 is a cellular network link.

In one embodiment, a radio link between the UE 201 and the UE 241 is a Sidelink.

In one embodiment, a transmitter of the first signaling in the present disclosure comprises the gNB 203.

In one embodiment, a receiver of the first signaling in the present disclosure comprises the UE 241.

In one embodiment, a transmitter of the first signal group comprises the gNB 203.

In one embodiment, a receiver of the first signal group in the present disclosure comprises the UE 241.

In one embodiment, a transmitter of the first signal group in the present disclosure comprises the UE 241.

In one embodiment, a receiver of the first signal group comprises the gNB 203.

Embodiment 3

Figure 3:
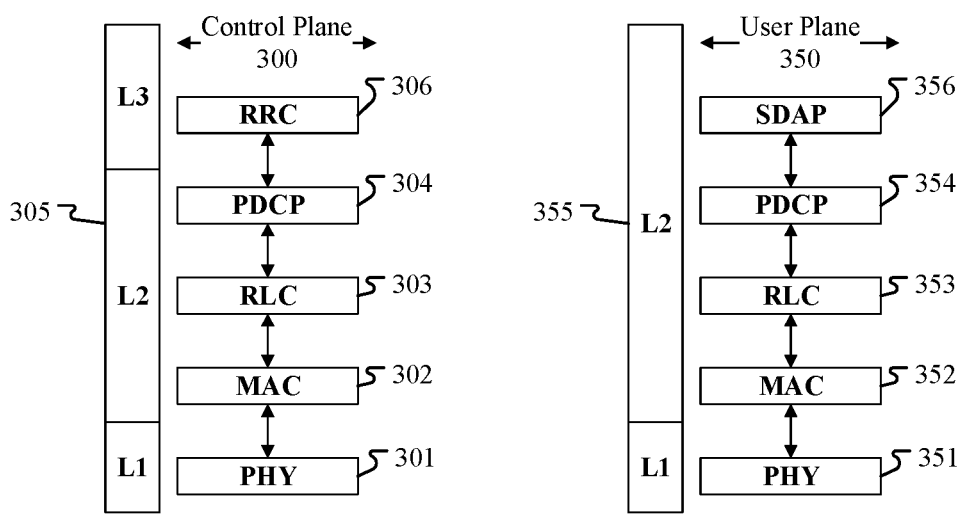
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, RSU in V2X or vehicle equipment or vehicle-mounted communication module) and a second communication node (gNB, UE, RSU in V2X or vehicle equipment or vehicle-mounted communication module), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, or between two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling is generated by the PHY 301 or the PHY 351.

In one embodiment, the first signaling is generated by the MAC sublayer 302 or the MAC sublayer 352.

In one embodiment, the first signal group is generated by the PHY 301 or the PHY 351.

In one embodiment, the first information block is generated by the MAC sublayer 302 or the MAC sublayer 352.

Embodiment 4

Figure 4:
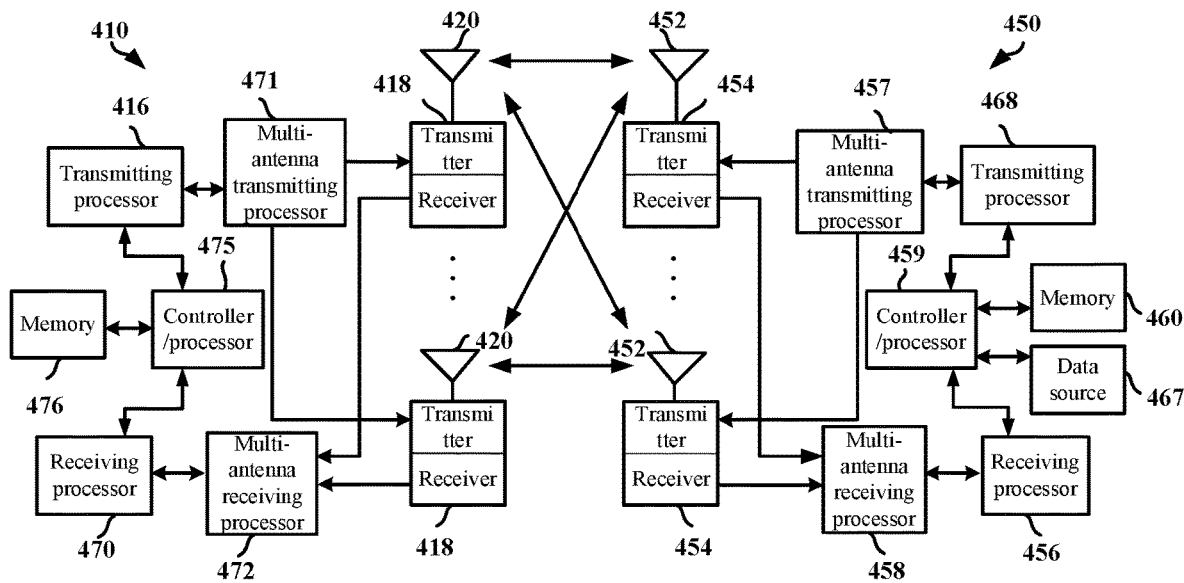
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signaling in the present disclosure; and operates the first signal group in the present disclosure; the first signal group comprises a positive integer number of signal(s); the first signaling comprises scheduling information of the first signal group; the first signaling is used for determining a first reference-signal-resource set; a first parameter-group set comprises a positive integer number of parameter group(s), any parameter group in the first parameter-group set is used for the operating action of a signal in the first signal group; any reference signal resource in the first reference-signal-resource set is used for determining a parameter group in the first parameter-group set; any parameter group in the first parameter-group set comprises one or more types of K types of candidate parameters, K being a positive integer greater than 1; the operating action is receiving or transmitting; which type(s) of the K types of candidate parameters comprised by any parameter group in the first parameter-group set is related to whether the operating action is receiving or transmitting.

In one embodiment, the second communication device 450 comprises a memory that stores a computer readable instruction program. The computer readable instruction program generates an action when executed by at least one processor. The action includes: receiving the first signaling in the present disclosure; and operating the first signal group in the present disclosure; the first signal group comprises a positive integer number of signal(s); the first signaling comprises scheduling information of the first signal group; the first signaling is used for determining a first reference-signal-resource set; a first parameter-group set comprises a positive integer number of parameter group(s), any parameter group in the first parameter-group set is used for the operating action of a signal in the first signal group; any reference signal resource in the first reference-signal-resource set is used for determining a parameter group in the first parameter-group set; any parameter group in the first parameter-group set comprises one or more types of K types of candidate parameters, K being a positive integer greater than 1; the operating action is receiving or transmitting; which type(s) of the K types of candidate parameters comprised by any parameter group in the first parameter-group set is related to whether the operating action is receiving or transmitting.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first signaling in the present disclosure; and executes the first signal group in the present disclosure; the first signal group comprises a positive integer number of signal(s); the first signaling comprises scheduling information of the first signal group; the first signaling is used for determining a first reference-signal-resource set; a first parameter-group set comprises a positive integer number of parameter group(s), any parameter group in the first parameter-group set is used for an operating action of a signal in the first signal group; the executing action is receiving or transmitting; when the executing action is receiving, the operating action is transmitting; when the executing action is transmitting, the operating action is receiving; any reference signal resource in the first reference-signal-resource set is used for determining a parameter group in the first parameter-group set; any parameter group in the first parameter-group set comprises one or more types of K types of candidate parameters, K being a positive integer greater than 1; which type(s) of the K types of candidate parameters comprised by any parameter group in the first parameter-group set is related to whether the operating action is receiving or transmitting.

In one embodiment, the first communication device 410 comprises a memory that stores a computer readable instruction program. The computer readable instruction program generates an action when executed by at least one processor. The action includes: transmitting the first signaling in the present disclosure; and executing the first signal group in the present disclosure; the first signal group comprises a positive integer number of signal(s); the first signaling comprises scheduling information of the first signal group; the first signaling is used for determining a first reference-signal-resource set; a first parameter-group set comprises a positive integer number of parameter group(s), any parameter group in the first parameter-group set is used for an operating action of a signal in the first signal group; the executing action is receiving or transmitting; when the executing action is receiving, the operating action is transmitting; when the executing action is transmitting, the operating action is receiving; any reference signal resource in the first reference-signal-resource set is used for determining a parameter group in the first parameter-group set; any parameter group in the first parameter-group set comprises one or more types of K types of candidate parameters, K being a positive integer greater than 1; which type(s) of the K types of candidate parameters comprised by any parameter group in the first parameter-group set is related to whether the operating action is receiving or transmitting.

In one embodiment, the first node in the present disclosure comprises the second communication device 450.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460 or the data source 467 is used to receive the first signaling in the present disclosure; and at least one of the antenna 420, the transmitter 418, the transmitting processor 416, the multi-antenna transmitting processor 471, the controller/processor 475 or the memory 476 is used to transmit the first signaling in the present disclosure.

In one embodiment, at least one of the antenna 452, the receiver 454, the receiving processor 456, the multi-antenna receiving processor 458, the controller/processor 459, the memory 460 or the data source 467 is used to receive the first signal group in the present disclosure; and at least one of the antenna 420, the transmitter 418, the transmitting processor 416, the multi-antenna transmitting processor 471, the controller/processor 475 or the memory 476 is used to transmit the first signal group in the present disclosure.

In one embodiment, at least one of the antenna 420, the receiver 418, the receiving processor 470, the multi-antenna receiving processor 472, the controller/processor 475 or the memory 476 is used to receive the first signal group in the present disclosure; and at least one of the antenna 452, the transmitter 454, the transmitting processor 468, the multi-antenna transmitting processor 457, the controller/processor 459, the memory 460 or the data source 467 is used to transmit the first signal group in the present disclosure.

In one embodiment, at least one of the antenna 452, the receiver 454, the receiving processor 456, the multi-antenna receiving processor 458, the controller/processor 459, the memory 460 or the data source 467 is used to receive the first information block in the present disclosure; and at least one of the antenna 420, the transmitter 418, the transmitting processor 416, the multi-antenna transmitting processor 471, the controller/processor 475, or the memory 476 is used to transmit the first information block in the present disclosure.

Embodiment 5

Figure 5:
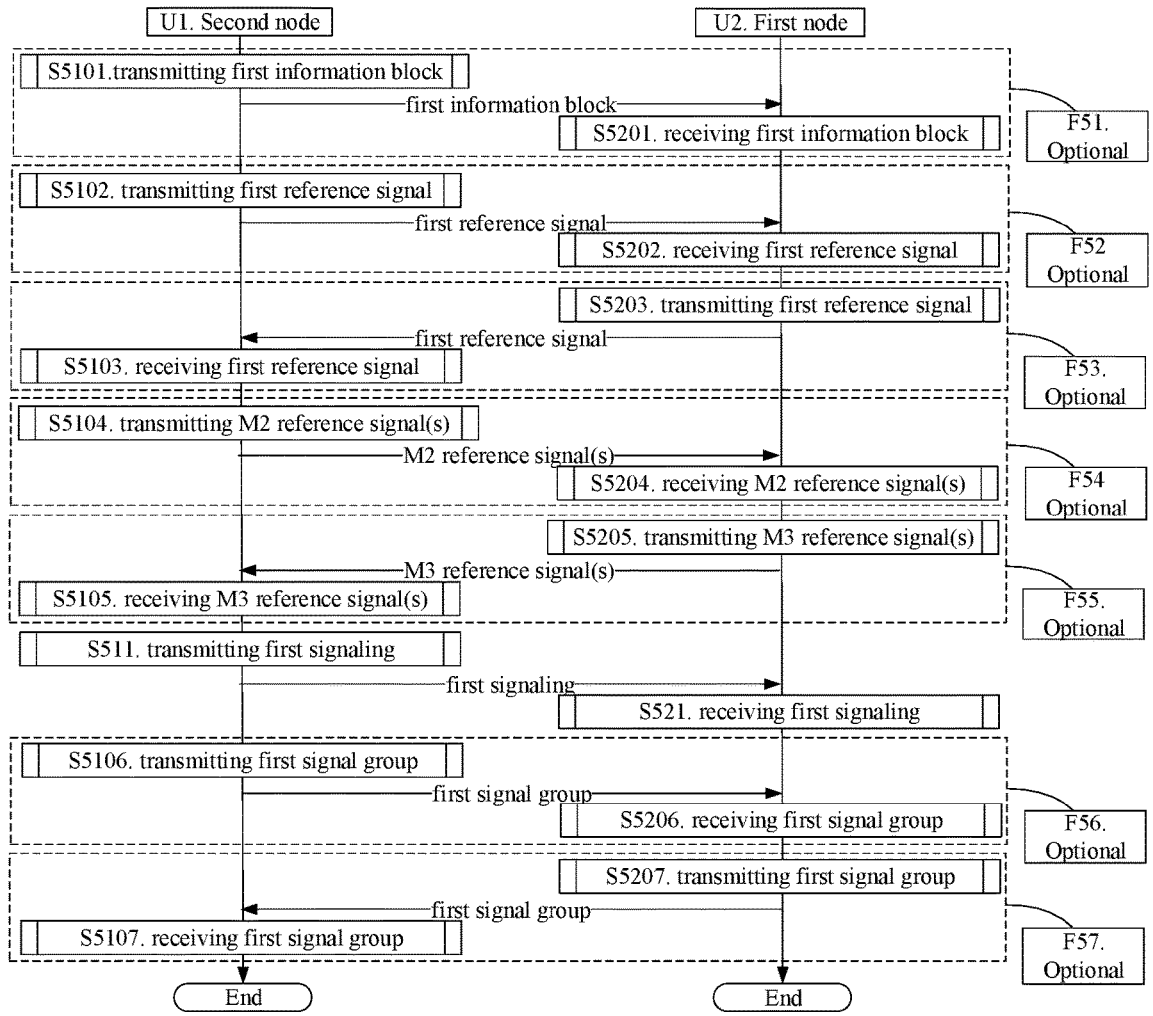
FIG. 5 illustrates a flowchart of wireless transmission according to one embodiment of the present disclosure.

Embodiment 5 illustrates a flowchart of wireless transmission according to one embodiment in the present disclosure, as shown in FIG. 5. In FIG. 5, a second node U1 and a first node U2 are communication nodes that transmit via air interfaces. In FIG. 5, steps in boxes F51 to F57 are optional; steps marked by only one of the box F52 or box F53 exist, and steps marked by the box F56 and the box F57 cannot coexist.

The second node U1 transmits a first information block in step S5101; transmits a first reference signal in step S5102; receives a first reference signal in step S5103; transmits M2 reference signal(s) in step S5104; receives M3 reference signal(s) in step S5105; transmits a first signaling in step S511; transmits a first signal group in step S5106; and receives a first signal group in step S5107.

The first node U2 receives a first information block in step S5201; receives a first reference signal in step S5202; transmits a first reference signal in step S5203; receives M2 reference signal(s) in step S5204; transmits M3 reference signal(s) in step S5205; receives a first signaling in step S521; receives a first signal group in step S5206; and transmits a first signal group in step S5207.

In Embodiment 5, the first signal group comprises a positive integer number of signal(s); the first signaling comprises scheduling information of the first signal group; the first signaling is used by the first node U2 for determining a first reference-signal-resource set; a first parameter-group set comprises a positive integer number of parameter group(s); when steps marked by box F56 in FIG. 5 exist, steps marked by box F57 do not exist, any reference group in the first parameter-group set is used by the first node U2 for receiving a signal in the first signal group; when steps marked by box F56 in FIG. 5 do not exist, steps marked by box F57 exist, any reference group in the first parameter-group set is used by the first node U2 for transmitting a signal in the first signal group; any reference signal resource in the first reference-signal-resource set is used by the first node U2 for determining a parameter group in the first parameter-group set; any parameter group in the first parameter-group set comprises one or more types of K types of candidate parameters, K being a positive integer greater than 1; which type(s) of the K types of candidate parameters comprised by any parameter group in the first parameter-group set is related to which of boxes F56 and F57 in FIG. 5 exists.

In one embodiment, the first node U2 is the first node in the present disclosure.

In one embodiment, the second node U1 is the second node in the present disclosure.

In one embodiment, an air interface between the second node U1 and the first node U2 comprises a radio interface between a base station and a UE.

In one embodiment, an air interface between the second node U1 and the first node U2 comprises a radio interface between UEs.

In one embodiment, if the executing action in the present disclosure is receiving, the operating action in the present disclosure is transmitting; and if the executing action in the present disclosure is transmitting, the operating action in the present disclosure is receiving.

In one embodiment, steps marked by box F51 in FIG. 5 exist; the first information block is used for activating N2 information units out of N1 information units, N1 and N2 are respectively positive integers greater than 1, and N2 is no greater than N1; any of the N2 information units indicates a positive integer number of reference signal resource(s), and any reference signal resource in the first reference-signal-resource set is a reference signal resource indicated by one of the N2 information units.

In one embodiment, the first information block is transmitted on a Physical Downlink Shared Channel (PDSCH).

In one embodiment, the first information block is transmitted on a Physical Sidelink Shared Channel (PSSCH).

In one embodiment, steps marked by box F51 in FIG. 5 do not exist.

In one embodiment, the first reference-signal-resource set only comprises a first reference signal resource, and the first reference signal resource is reserved for a first reference signal.

In one subembodiment of the above embodiment, the first reference signal is earlier than the first signaling.

In one subembodiment of the above embodiment, the first reference signal is later than the first signaling.

In one embodiment, steps marked by box F52 in FIG. 5 exist, while steps marked by box F53 do not exist.

In one embodiment, the method in a first node for wireless communications comprises:
receiving the first reference signal.

In one embodiment, the method in a second node for wireless communications comprises:
transmitting the first reference signal.

In one embodiment, steps marked by box F52 in FIG. 5 do not exist, while steps marked by box F53 exist.

In one embodiment, the method in a first node for wireless communications comprises:
transmitting the first reference signal.

In one embodiment, the method in a second node for wireless communications comprises:
receiving the first reference signal.

In one embodiment, the first reference-signal-resource set comprises M1 reference signal resources, M1 being a positive integer greater than 1; the M1 reference signal resources are respectively reserved for M1 reference signals.

In one subembodiment of the above embodiment, there exists one of the M1 reference signals earlier than the first signaling.

In one subembodiment of the above embodiment, there exists one of the M1 reference signals later than the first signaling.

In one embodiment, steps marked by box F54 in FIG. 5 exist.

In one embodiment, the method in a first node for wireless communications comprises:
receiving M2 reference signal(s); herein, M2 is a positive integer no greater than the M1, and the M2 reference signal(s) is(are) subset(s) of the M1 reference signals.

In one embodiment, the method in a second node for wireless communications comprises:
transmitting M2 reference signal(s); herein, M2 is a positive integer no greater than the M1, and the M2 reference signal(s) is(are) subset(s) of the M1 reference signals.

In one embodiment, steps marked by box F55 in FIG. 5 exist.

In one embodiment, the method in a first node for wireless communications comprises:
transmitting M3 reference signal(s); herein, M3 is a positive integer no greater than the M1, and the M3 reference signal(s) is(are) subset(s) of the M1 reference signals.

In one embodiment, the method in a second node for wireless communications comprises:
receiving M3 reference signal(s); herein, M3 is a positive integer no greater than the M1, and the M3 reference signal(s) is(are) subset(s) of the M1 reference signals.

In one embodiment, steps marked by box F54 in FIG. 5 exist, while steps marked by box F55 do not exist; and the M2 is equal to the M1.

In one embodiment, steps marked by box F54 in FIG. 5 do not exist, while steps marked by box F55 exist; and the M3 is equal to the M1.

In one embodiment, steps marked by boxes F54 and F55 in FIG. 5 all exist; the M2 and the M3 are positive integers greater than 0, and a sum of the M2 and the M3 is equal to the M1.

In one embodiment, steps marked by box F56 in FIG. 5 exist, while steps in box F57 do not exist; the operating action in the present disclosure is receiving, and the executing action in the present disclosure is transmitting.

In one embodiment, steps marked by box F56 in FIG. 5 do not exist, while steps in box F57 exist; the operating action in the present disclosure is transmitting, and the executing action in the present disclosure is receiving.

In one embodiment, the first signaling is transmitted on a downlink physical layer control channel (i.e., a downlink channel that is only capable of carrying a physical layer signaling).

In one embodiment, the first signaling is transmitted on a Physical Downlink Control CHannel (PDCCH).

In one embodiment, the first signaling is transmitted on a Physical Sidelink Control CHannel (PSCCH).

In one embodiment, the first signal group is transmitted on a downlink physical layer data channel (i.e., a downlink channel capable of carrying physical layer data).

In one embodiment, the first signal group is transmitted on a PDSCH.

In one embodiment, the first signal group comprises multiple signals, and the multiple signals are transmitted on a same PDSCH.

In one embodiment, the first signal group is transmitted on an Uplink physical layer data channel (i.e., an Uplink channel capable of carrying physical layer data).

In one embodiment, the first signal group is transmitted on a Physical Uplink Shared CHannel (PUSCH).

In one embodiment, the first signal group comprises multiple signals, and the multiple signals are transmitted on a same PUSCH.

In one embodiment, the first signal group is transmitted on a Physical Sidelink Shared CHannel (PSSCH).

In one embodiment, the first signal group is transmitted on a PUCCH.

Embodiment 6

Embodiment 6 illustrates a schematic diagram of any parameter group in a first parameter-group set used for an operating action of a signal in a first signal group according to one embodiment of the present disclosure; as shown in FIG. 6. In Embodiment 6, the operating action is receiving, or, the operating action is transmitting.

In one embodiment, the first signal group only comprises a first signal; each parameter group in the first parameter-group set is used for the operating action of the first signal.

In one embodiment, the first signal group comprises a second signal and a third signal, and a number of parameter groups comprised in the first parameter-group set is greater than 1; a second parameter group subset is used for the operating action of the second signal, and a third parameter group subset is used for the operating action of the third signal; the second parameter group subset and the third parameter group subset are respectively subsets of the first parameter-group set.

In one subembodiment of the above embodiment, the operating action is receiving; the second parameter group subset is used by the first node for receiving the second signal, and the third parameter group subset is used by the first node for receiving the third signal.

In one subembodiment of the above embodiment, there does not exist a parameter group in the first parameter-group set simultaneously belonging to the second parameter group subset and the third parameter group subset.

In one subembodiment of the above embodiment, any transmission antenna port of the second signal and any transmission antenna port of the third signal cannot be assumed to be QCL.

In one subembodiment of the above embodiment, any transmission antenna port of the second signal and any transmission antenna port of the third signal cannot be assumed to be QCL with a corresponding QCL type of QCL-TypeD.

In one embodiment, a number of parameter groups comprised in the first parameter-group set is no less than a number of signals comprised in the first signal group.

In one embodiment, a number of parameter groups comprised in the first parameter-group set is less than a number of signals comprised in the first signal group.

In one embodiment, for any given signal in the first signal group, at least one parameter group in the first parameter-group set is used for the operating action of the given signal.

In one embodiment, there exists a given signal in the first signal group, and multiple parameter groups in the first parameter-group set are used for the operating action of the given signal.

In one embodiment, there exists a given signal in the first signal group, the operating action of the given signal is unrelated to any parameter group in the first parameter-group set.

In one embodiment, for any given parameter group in the first parameter-group set, the given parameter group is used for the operating action of one and only one signal in the first signal group.

In one embodiment, there exists a given signal in the first signal group, and the given parameter group is used for the operating action of multiple signals in the first signal group.

Embodiment 7

Embodiment 7 illustrates a schematic diagram of any reference signal resource in a first reference-signal-resource set used for determining a parameter group in a first parameter-group set according to one embodiment of the present disclosure, as shown in FIG. 7.

In one embodiment, a number of reference signal resources comprised in the first reference-signal-resource set is equal to a number of parameter groups comprised in the first parameter-group set; all reference signal resources comprised in the first reference-signal-resource set respectively correspond to all parameter groups comprised in the first parameter-group set; and any reference signal resource in the first reference-signal-resource set is used for determining a corresponding parameter group in the first parameter-group set.

In one embodiment, the first reference-signal-resource set only comprises a first reference signal resource, the first parameter-group set only comprises a first parameter group, and the first reference signal resource is used for determining the first parameter group.

In one embodiment, the first reference-signal-resource set comprises M1 reference signal resources, the first parameter-group set comprises M1 parameter groups, M1 being a positive integer greater than 1; and the M1 reference signal resources are respectively used for determining the M1 parameter groups.

In one embodiment, for any given parameter group in the first parameter-group set, one reference signal resource in the first reference-signal-resource set is used for determining the given parameter group.

In one embodiment, for any given parameter group in the first parameter-group set, one and only one reference signal resource in the first reference-signal-resource set is used for determining the given parameter group.

In one embodiment, there exists one given parameter group in the first parameter-group set, and multiple reference signal resources in the first reference-signal-resource set are used for determining the given parameter group.

In one embodiment, any reference signal resource in the first reference-signal-resource set is used for determining one and only one parameter group in the first parameter-group set.

In one embodiment, there exists a reference signal resource in the first reference-signal-resource set used for determining multiple parameter groups in the first parameter-group set.

Embodiment 8

Embodiment 8 illustrates a schematic diagram of relations among a given parameter group, a given signal and a given reference signal resource according to one embodiment of the present disclosure; as shown in FIG. 8. In Embodiment 8, the operating action is receiving; the given parameter group is any parameter group in the first parameter-group set, the given parameter group is used for a reception of the given signal in the first signal group, and the given reference signal resource in the first reference-signal-resource set is used for determining the given parameter group; and the given reference signal resource is reserved for the given reference signal.

In one embodiment, the given parameter group comprises a spatial-domain filter; the phrase that the given parameter group is used for a reception of the given signal and the given reference signal resource is used for determining the given parameter group comprises: the first node uses a same spatial-domain filter for receiving the given signal and the given reference signal.

In one embodiment, the given parameter group comprises a spatial-domain filter; the phrase that the given parameter group is used for a reception of the given signal and the given reference signal resource is used for determining the given parameter group comprises: the first node uses a same spatial-domain filter for receiving the given signal and transmitting the given reference signal.

In one embodiment, the given parameter group comprises large-scale properties; the phrase that the given parameter group is used for a reception of the given signal and the given reference signal resource is used for determining the given parameter group comprises: all or part of large-scale properties of a channel that the given reference signal goes through can be used for inferring all or part of large-scale properties of a channel that the given signal goes through.

In one embodiment, the given parameter group comprises delay spread, Doppler spread, Doppler shift and average delay; the phrase that the given parameter group is used for a reception of the given signal and the given reference signal resource is used for determining the given parameter group comprises: delay spread, Doppler spread, Doppler shift and average delay of a channel that the given reference signal goes through can be respectively used for referring delay spread, Doppler spread, Doppler shift and average delay of a channel that the given signal goes through.

In one embodiment, the given parameter group comprises Doppler spread and Doppler shift; the phrase that the given parameter group is used for a reception of the given signal and the given reference signal resource is used for determining the given parameter group comprises: Doppler spread and Doppler shift of a channel that the given reference signal goes through can be respectively used for referring Doppler spread and Doppler shift of a channel that the given signal goes through.

In one embodiment, the given parameter group comprises average delay and Doppler shift; the phrase that the given parameter group is used for a reception of the given signal and the given reference signal resource is used for determining the given parameter group comprises: average delay and Doppler shift of a channel that the given reference signal goes through can be respectively used for referring average delay and Doppler shift of a channel that the given signal goes through.

In one embodiment, the given parameter group comprises Spatial Rx parameters; the phrase that the given parameter group is used for a reception of the given signal and the given reference signal resource is used for determining the given parameter group comprises: spatial Rx parameters of the given reference signal can be used for inferring spatial Rx parameters of the given signal.

In one embodiment, the given parameter group comprises a reception antenna; the phrase that the given parameter group is used for a reception of the given signal and the given reference signal resource is used for determining the given parameter group comprises: the first node employs a same antenna to receive the given signal and the given reference signal.

In one embodiment, the given parameter group comprises a reception antenna; the phrase that the given parameter group is used for a reception of the given signal and the given reference signal resource is used for determining the given parameter group comprises: the first node employs a same antenna to receive the given signal and transmit the given reference signal.

Embodiment 9

Embodiment 9 illustrates a schematic diagram of relations among a given parameter group, a given signal and a given reference signal resource according to one embodiment of the present disclosure; as shown in FIG. 9. In Embodiment 9, the operating action is transmitting; the given parameter group is any parameter group in the first parameter-group set, the given parameter group is used for a transmission of the given signal in the first signal group, and the given reference signal resource in the first reference-signal-resource set is used for determining the given parameter group; and the given reference signal resource is reserved for the given reference signal.

In one embodiment, the given parameter group comprises a spatial-domain filter; the phrase that the given parameter group is used for a transmission of the given signal and the given reference signal resource is used for determining the given parameter group comprises: the first node employs a same spatial-domain filter for transmitting the given signal and the given reference signal.

In one embodiment, the given parameter group comprises a spatial-domain filter; the phrase that the given parameter group is used for a transmission of the given signal and the given reference signal resource is used for determining the given parameter group comprises: the first node employs a same spatial-domain filter for transmitting the given signal and receiving the given reference signal.

In one embodiment, the given parameter group comprises precoding; the phrase that the given parameter group is used for a transmission of the given signal and the given reference signal resource is used for determining the given parameter group comprises: precoding of the given reference signal is used for determining precoding of the given signal.

In one embodiment, the given parameter group comprises precoding; the phrase that the given parameter group is used for a transmission of the given signal and the given reference signal resource is used for determining the given parameter group comprises: a reception of the given reference signal is used for determining precoding of the given signal.

In one embodiment, the given parameter group comprises precoding; the given reference signal comprises L3 reference sub-signals, L3 being a positive integer greater than 1, and the L3 reference sub-signals are respectively transmitted by L3 different reference signal ports; a precoding matrix of the given signal consists of precoding vectors of part or all of the L3 reference sub-signals.

In one embodiment, the given parameter group comprises precoding; the given reference signal comprises L3 reference sub-signals, L3 being a positive integer greater than 1, and the L3 reference sub-signals are respectively transmitted by L3 different reference signal ports; the given signal comprises L1 sub-signal(s), L1 being a positive integer no greater than the L3; precoding vector(s) of the L1 sub-signal(s) is (are respectively) precoding vector(s) of L1 reference sub-signal(s) in the L3 reference sub-signals.

In one subembodiment of the above embodiment, the L1 sub-signal(s) is (are respectively) L1 layer(s) of the given signal.

In one embodiment, the given parameter group comprises a TA; the phrase that the given parameter group is used for a transmission of the given signal and the given reference signal resource is used for determining the given parameter group comprises: a TA of the given reference signal is used for determining a TA of the given signal.

In one embodiment, the given parameter group comprises a TA; the phrase that the given parameter group is used for a transmission of the given signal and the given reference signal resource is used for determining the given parameter group comprises: the given signal and the given reference signal have a same TA.

In one embodiment, the given parameter group comprises power control parameters; the phrase that the given parameter group is used for a transmission of the given signal and the given reference signal resource is used for determining the given parameter group comprises: power control parameters of the given reference signal are used for determining power control parameters of the given signal.

In one embodiment, the given parameter group comprises power control parameters; the phrase that the given parameter group is used for a transmission of the given signal and the given reference signal resource is used for determining the given parameter group comprises: the given signal and the given reference signal employ same power control parameters.

In one embodiment, the given parameter group comprises power control parameters; the phrase that the given parameter group is used for a transmission of the given signal and the given reference signal resource is used for determining the given parameter group comprises: Reference Signal Received Power (RSRP) of the given reference signal is used for determining downlink pathloss employed when transmission power of the given signal is calculated.

In one embodiment, the given parameter group comprises a PTRS port; the phrase that the given parameter group is used for a transmission of the given signal and the given reference signal resource is used for determining the given parameter group comprises: the given reference signal resource is used for determining a PTRS port corresponding to the given signal.

In one embodiment, the given parameter group comprises a PTRS port; the phrase that the given parameter group is used for a transmission of the given signal and the given reference signal resource is used for determining the given parameter group comprises: a PTRS port corresponding to the given signal is a PTRS port on which the given reference signal resource is configured.

In one embodiment, the given parameter group comprises a PTRS port; the given signal comprises L2 sub-signal(s), the given reference signal resource comprises L2 sub-resource(s), L2 being a positive integer; PTRS port(s) corresponding to the L2 sub-signal(s) is (are respectively) PTRS port(s) on which the L2 sub-resource(s) is(are) configured.

In one subembodiment of the above embodiment, the L2 is equal to 1.

In one subembodiment of the above embodiment, the L2 is greater than 1.

In one subembodiment of the above embodiment, the first signaling indicates the L2.

In one subembodiment of the above embodiment, the first signaling indicates the L2 sub-resource(s) out of the given reference signal resource.

In one subembodiment of the above embodiment, the given reference signal resource comprises an SRS resource set.

In one subembodiment of the above embodiment, the L2 sub-resource(s) is (are respectively) L2 SRS resource(s).

In one embodiment, the given parameter group comprises a transmission antenna; the phrase that the given parameter group is used for a transmission of the given signal and the given reference signal resource is used for determining the given parameter group comprises: the first node employs a same antenna to transmit the given signal and the given reference signal.

In one embodiment, the given parameter group comprises a transmission antenna; the phrase that the given parameter group is used for a transmission of the given signal and the given reference signal resource is used for determining the given parameter group comprises: the first node employs a same antenna to transmit the given signal and receive the given reference signal.

Embodiment 10

Embodiment 10 illustrates a schematic diagram of which type(s) of K types of candidate parameters comprised by any parameter group in the first parameter-group set being related to whether an operating action is receiving or transmitting according to one embodiment of the present disclosure; as shown in FIG. 10. In Embodiment 10, K1 types of candidate parameters and K2 types of candidate parameters are respectively subsets of the K types of candidate parameters, K1 and K2 being positive integers greater than 1; there at least exists one kind of candidate parameter that belongs to and only belongs to one of the K1 types of candidate parameters or the K2 candidate parameters; when the operating action is receiving, any parameter in the first parameter-group set belongs to the K1 types of candidate parameters; and when the operating action is transmitting, any parameter in the first parameter-group set belongs to the K2 types of candidate parameters.

In one embodiment, the K1 types of candidate parameters and the K2 types of candidate parameters are respectively pre-defined.

In one embodiment, the K1 types of candidate parameters and the K2 types of candidate parameters are respectively configured by higher-layer signalings.

In one embodiment, there exists no type of candidate parameter that belongs to the K1 types of candidate parameters and the K2 types of candidate parameters simultaneously.

In one embodiment, there exists one type of candidate parameter that belongs to the K1 types of candidate parameters and the K2 types of candidate parameters simultaneously.

Embodiment 11

Embodiment 11 illustrates a schematic diagram of a first signaling according to one embodiment of the present disclosure, as shown in FIG. 11. In Embodiment 11, the first signaling comprises a first field, the first field in the first signaling indicates the first reference-signal-resource set; and the first field of the first signaling comprises a positive integer number of bit(s).

In one embodiment, the first field in the first signaling comprises part or all of information in a Transmission Configuration Indicator (TCI) field.

In one embodiment, the first field in the first signaling indicates TCI.

In one embodiment, the first field in the first signaling comprises 3 bits.

In one embodiment, a number of bits comprised in the first field in the first signaling is unrelated to whether the operating action is receiving or transmitting.

In one embodiment, a value range of the first field in the first signaling is related to whether the operating action is receiving or transmitting.

In one embodiment, the first field in the first signaling indicates the first information unit.

In one embodiment, a value of the first field in the first signaling is equal to a TCI codepoint corresponding to the first information unit.

In one embodiment, a value of the first field in the first signaling indicates the second information unit and the third information unit.

In one embodiment, the second information unit and the third information unit correspond to a same TCI codepoint, and a value of the first field in the first signaling is equal to a TCI codepoint corresponding to the second information unit and the third information unit.

In one embodiment, the first field in the first signaling indicates a first TCI codepoint out of Q candidate TCI codepoints, Q being a positive integer greater than 1; the Q candidate TCI codepoints respectively correspond to Q information unit sets, and any of the Q information unit sets comprises a positive integer number of information unit(s); a first information unit set is one of the Q information unit set that corresponds to the first TCI codepoint; the first information unit set indicates the first reference-signal-resource set; and the Q information unit sets are unrelated to whether the operating action is receiving or transmitting.

In one subembodiment of the above embodiment, a range value of the first field in the first signaling is the Q candidate TCI codepoints.

In one subembodiment of the above embodiment, a value of the first field in the first signaling is equal to the first TCI codepoint.

In one subembodiment of the above embodiment, the Q is a positive integer no greater than 8 and greater than 1.

In one subembodiment of the above embodiment, the Q is equal to 8.

In one subembodiment of the above embodiment, corresponding relations among the Q candidate TCI codepoints and the Q information unit sets are configured by a higher-layer signaling.

In one subembodiment of the above embodiment, corresponding relations among the Q candidate TCI codepoints and the Q information unit sets are configured by a Medium Access Control layer Control Element (MAC CE) signaling.

In one subembodiment of the above embodiment, the first information block indicates corresponding relations among the Q candidate TCI codepoints and the Q information unit sets.

In one subembodiment of the above embodiment, corresponding relations among the Q candidate TCI codepoints and the Q information unit sets are unrelated to whether the operating action is receiving or transmitting.

In one subembodiment of the above embodiment, there exists one of the Q information unit sets that only comprises one information unit.

In one subembodiment of the above embodiment, there exists one of the Q information unit sets that comprises two information units.

In one subembodiment of the above embodiment, any information unit in the Q information unit sets comprises information in all or part of fields in an Information Element (IE).

In one subembodiment of the above embodiment, any information unit in the Q information unit sets comprises information in all or part of fields in a TCI-State IE.

In one subembodiment of the above embodiment, any information unit in the Q information unit sets is a TCI-State IE.

In one subembodiment of the above embodiment, the first information unit set consists of the first information unit.

In one subembodiment of the above embodiment, the first information unit set consists of the second information unit and the third information unit.

In one subembodiment of the above embodiment, the first information unit set comprises the second information unit and the third information unit.

Embodiment 12

Embodiment 12 illustrates a schematic diagram of a relation between a first associated type set and a first reference-signal-resource set according to one embodiment of the present disclosure; as shown in FIG. 12. In Embodiment 12, any reference signal resource in the first reference-signal-resource set corresponds to one associated type in the first associated type set.

In one embodiment, the first associated type set comprises a positive integer number of QCL type(s).

In one embodiment, any associated type in the first associated type set is a QCL type.

In one embodiment, there exists an associated type in the first associated type set being a QCL type.

In one embodiment, the specific meaning of the QCL type can be found in 3GPP TS38.214.

In one embodiment, the first associated type set only comprises one associated type.

In one embodiment, the first associated type set comprises multiple associated types.

In one subembodiment of the above embodiment, the multiple associated types are mutually different.

In one subembodiment of the above embodiment, there exist two same associated types among the multiple associated types.

In one embodiment, a number of associated types comprised in the first associated type set is no less than a number of reference signal resources comprised in the first reference-signal-resource set.

In one embodiment, a number of associated types comprised in the first associated type set is equal to a number of reference signal resources comprised in the first reference-signal-resource set, and all associated types comprised in the first associated type set respectively correspond to all reference signal resources comprised in the first reference-signal-resource set.

In one subembodiment of the above embodiment, a number of reference signal resources comprised in the first reference-signal-resource set is equal to a number of parameter groups comprised in the first parameter-group set, and all reference signal resources comprised in the first reference-signal-resource set respectively correspond to all parameter groups comprised in the first parameter-group set; for any given reference signal resource in the first reference-signal-resource set, the given reference signal resource corresponds to a given parameter group in the first parameter-group set, and the given reference signal resource corresponds to a given associated type in the first associated type set; the given reference signal resource is used for determining the given parameter group, and which type(s) of the K types of candidate parameters comprised by the given parameter group is related to the given associated type.

In one reference embodiment of the above subembodiment, which type(s) of the K types of candidate parameters comprised by the given parameter group is both related to the given associated type and whether the operating action is receiving or transmitting.

In one embodiment, any reference signal resource in the first reference-signal-resource set corresponds to only one associated type in the first associated type set.

In one embodiment, there exists one reference signal resource in the first reference-signal-resource set that corresponds to multiple associated types in the first associated type set.

In one embodiment, any associated type in the first associated type set corresponds to one reference signal resource in the first reference-signal-resource set.

In one embodiment, any associated type in the first associated type set corresponds to one and only one reference signal resource in the first reference-signal-resource set.

In one embodiment, there exists one associated type in the first associated type set that corresponds to multiple reference signal resources in the first reference-signal-resource set.

In one embodiment, the first reference-signal-resource set only comprises a first reference signal resource, the first parameter-group set only comprises a first parameter group, and the first reference signal resource is used for determining the first parameter group; the first associated type set only comprises a first associated type, the first reference signal resource corresponds to the first associated type, and which type(s) of the K types of candidate parameters comprised by the first parameter group is related to the first associated type.

In one embodiment, the first reference-signal-resource set comprises M1 reference signal resources, M1 being a positive integer greater than 1; the first parameter-group set comprises M1 parameter groups, and the M1 reference signal resources are respectively used for determining the M1 parameter groups; the first associated type set comprises M1 associated types, and the M1 reference signal resources respectively correspond to the M1 associated types; which type(s) of the K types of candidate parameters comprised by any of the M1 parameter groups is related to an associated type corresponding to the given parameter group.

Embodiment 13

Embodiment 13 illustrates a schematic diagram of a relation between a target parameter group and a target associated type according to one embodiment of the present disclosure; as shown in FIG. 13. In Embodiment 13, the target associated type is one of P candidate associated types, P being a positive integer greater than 1; which type(s) of the K types of candidate parameters comprised by the target parameter group is both related to the target associated type and whether the operating action is receiving or transmitting.

In one embodiment, whether the operating action is receiving or transmitting and the target associated type are used together for determining which type(s) of the K types of candidate parameters comprised by the target parameter group.

In one embodiment, any associated type in the first associated type set is one of the P candidate associated types.

In one embodiment, the P candidate associated types are predefined.

In one embodiment, the P candidate associated types are related to whether the operating action is receiving or transmitting.

In one embodiment, the P candidate associated types comprise a positive integer number of QCL type(s).

In one embodiment, the P candidate associated types comprise QCL-TypeA QCL-TypeB, QCL-TypeC and QCL-TypeD.

In one embodiment, the specific meanings of the QCL-TypeA, QCL-TypeB, QCL-TypeC and QCL-TypeD can be found in 3GPP TS38.214.

In one embodiment, any of P first-type parameter groups consists of a positive integral type(s) of candidate parameter(s) in the K1 types of candidate parameters in Embodiment 10, any of P second-type candidate parameter groups consists of a positive integral type(s) of candidate parameter(s) in the K2 types of candidate parameters in Embodiment 10; the P candidate associated types respectively correspond to the P first-type candidate parameter groups, and the P candidate associated types respectively correspond to the P second-type candidate parameter groups; when the operating action is receiving, the target parameter group comprises one of the P first-type candidate parameter groups that corresponds to the target associated type; when the operating action is transmitting, the target parameter group comprises one of the P second-type candidate parameter groups that corresponds to the target associated type.

In one subembodiment of the above embodiment, for any two of the P first-type candidate parameter groups, there exists one type of the K1 types of candidate parameters that belongs to and only belongs to one of the two first-type candidate parameter groups.

In one subembodiment of the above embodiment, there exists one type of the K1 types of candidate parameter that belongs to two of the P first-type candidate parameter groups.

In one subembodiment of the above embodiment, for any two of the P second-type candidate parameter groups, there exists one type of the K2 types of candidate parameters that belongs to and only belongs to one of the two second-type candidate parameter groups.

In one subembodiment of the above embodiment, there exists one type of the K2 types of candidate parameter that belongs to two of the P second-type candidate parameter groups.

In one subembodiment of the above embodiment, the P first-type candidate parameter groups are predefined.

In one subembodiment of the above embodiment, the P second-type candidate parameter groups are predefined.

In one subembodiment of the above embodiment, corresponding relations among the P candidate associated types and the P first-type candidate parameter groups are predefined.

In one subembodiment of the above embodiment, corresponding relations among the P candidate associated types and the P second-type candidate parameter groups are predefined.

In one embodiment, the target associated type is related to whether the operating action is receiving or transmitting.

In one embodiment, when the operating action is receiving, the target associated type is one of P1 candidate associated type(s); when the operating action is receiving, the target associated type is one of P2 candidate associated type(s); the P1 candidate associated type(s) and the P2 candidate associated type(s) respectively consist of a positive integer number of candidate associated type(s) in the P candidate associated types, P1 and P2 respectively being positive integers; there at least exists one of the P candidate associated types that belongs to and only belongs to one of the P1 candidate associated type(s) and the P2 candidate associated type(s).

In one embodiment, the target reference signal resource corresponds to S1 associated types, S1 being a positive integer greater than 1; the target associated type is one of the S1 associated types; whether the operating action is receiving or transmitting is used for determining the target associated type out of the S1 associated types.

In one subembodiment of the above embodiment, the S1 is equal to 2; when the operating action is receiving, the target associated type is one of the S1 associated types; and when the operating action is transmitting, the target associated type is another one of the S1 associated types;

In one embodiment, an interpretation on the target associated type is related to whether the operating action is receiving or transmitting.

In one embodiment, when the operating action is receiving, the target associated type is used for determining which type(s) of the K1 types of candidate parameters in Embodiment 10 comprised by the target parameter group; when the operating action is transmitting, the target associated type is used for determining which type(s) of the K2 types of candidate parameters in Embodiment 10 comprised by the target parameter group.

In one embodiment, which type(s) of the K types of candidate parameters comprised by the target parameter group is related to only the target associated type in the first associated type set.

In one embodiment, which type(s) of the K types of candidate parameters comprised by the target parameter group is related to at least one associated type other than the target associated type in the first associated type set.

Embodiment 14

Figure 14:
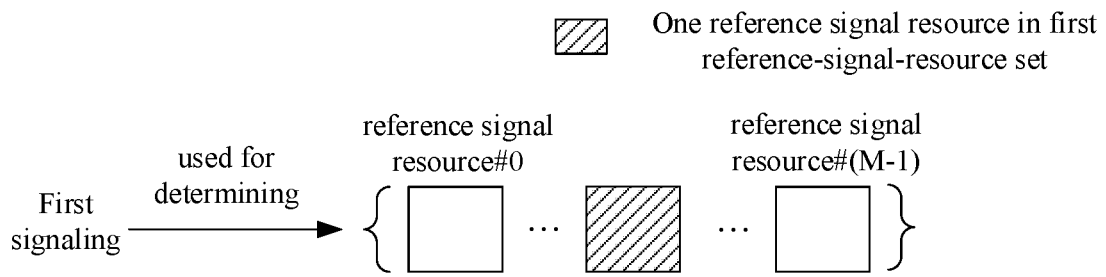
FIG. 14 illustrates a schematic diagram of M reference signal resources and a first reference-signal-resource set according to one embodiment of the present disclosure.

Embodiment 14 illustrates a schematic diagram of M reference signal resources and a first reference-signal-resource set according to one embodiment of the present disclosure; as shown in FIG. 14. In Embodiment 14, the first signaling is used for determining the M reference signal resources; the first reference-signal-resource set is a subset of the M reference signal resources. In FIG. 14, indexes of the M reference signal resources are respectively #0, . . . , #(M−1).

In one embodiment, the first signaling is used by the first node for determining the M reference signal resources.

In one embodiment, the first signaling indicates the M reference signal resources.

In one embodiment, the first signaling explicitly indicates the M reference signal resources.

In one embodiment, the first signaling implicitly indicates the M reference signal resources.

In one embodiment, the first signaling indicates each of the M reference signal resources.

In one embodiment, the first reference-signal-resource set consists of all or part of the M reference signal resources.

In one embodiment, the first reference-signal-resource set only comprises part of reference signal resources in the M reference signal resources.

In one embodiment, the M reference signal resources comprise a CSI-RS resource.

In one embodiment, the M reference signal resources comprise a CSI-RS resource set.

In one embodiment, the M reference signal resources comprise an SRS resource.

In one embodiment, the M reference signal resources comprise an SRS resource set.

In one embodiment, the M reference signal resources comprise an SSB resource.

In one embodiment, any of the M reference signal resources is one of a CSI-RS resource, a CSI-RS resource set, an SRS resource, an SRS resource set or an SSB resource.

In one embodiment, the M reference signal resources respectively correspond to M associated types, and the first associated type set consists of all associated types in the M associated types that correspond to one reference signal resource in the first reference-signal-resource set.

In one subembodiment of the above embodiment, any associated type in the M associated types is one of the P candidate associated types in Embodiment 13.

In one subembodiment of the above embodiment, the first information unit indicates the M associated types.

In one subembodiment of the above embodiment, the second information unit indicates all associated types in the M associated types that correspond to one reference signal resource in the second reference-signal-resource subset, and the third information unit indicates all associated types in the M associated types that correspond to one reference signal resource in the third reference-signal-resource subset.

In one embodiment, the operating action of the first signal group is unrelated to any of the M reference signal resource not belonging to the first reference-signal-resource set.

In one embodiment, the first information unit set in Embodiment 11 indicates the M reference signal resources.

Embodiment 15

Figure 15:
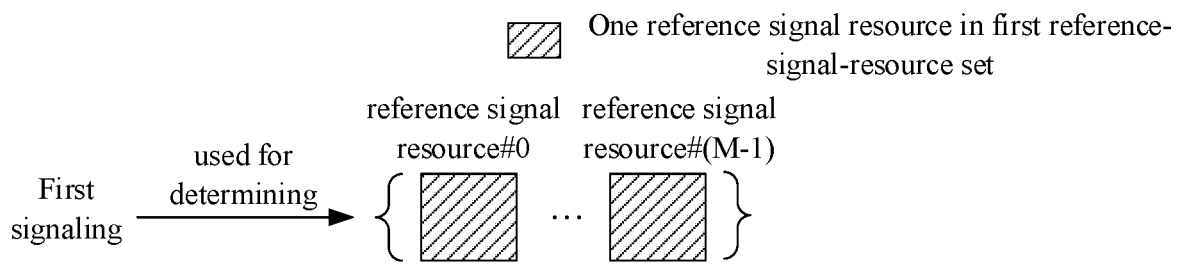
FIG. 15 illustrates a schematic diagram of M reference signal resources and a first reference-signal-resource set according to one embodiment of the present disclosure.

Embodiment 15 illustrates a schematic diagram of M reference signal resources and a first reference-signal-resource set according to one embodiment of the present disclosure; as shown in FIG. 15. In Embodiment 15, the first reference-signal-resource set comprises all of the M reference signal resources.

Embodiment 16

Figure 16:
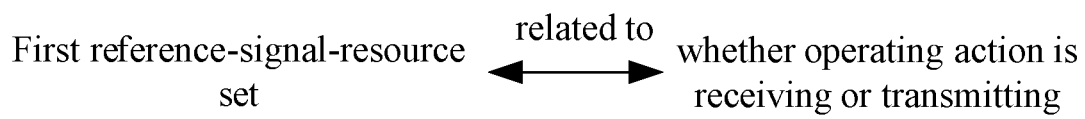
FIG. 16 illustrates a schematic diagram of a first reference-signal-resource set being related to whether an operating action is receiving or transmitting according to one embodiment of the present disclosure.

Embodiment 16 illustrates a schematic diagram of a first reference-signal-resource set related to whether an operating action is receiving or transmitting according to one embodiment of the present disclosure; as shown in FIG. 16. In Embodiment 16, which of the M reference signal resources comprised in the first reference-signal-resource set is related to whether the operating action is receiving or transmitting.

In one embodiment, whether the operating action is receiving or transmitting is used for determining the first reference-signal-resource set out of the M reference signal resources.

In one embodiment, which of the M reference signal resources comprised in the first reference-signal-resource set is related to types of the M reference signal resources.

In one embodiment, whether the operating action is receiving or transmitting and types of the M reference signal resources are used together for determining the first reference-signal-resource set out of the M reference signal resources.

In one embodiment, for any given reference signal resource in the M reference signal resources, if a type of the given reference signal resource belongs to a first reference signal resource type subset, the given reference signal resource belongs to the first reference-signal-resource set only when the operating action is receiving; and if the type of the given reference signal resource belongs to a second reference signal resource type subset, the given reference signal resource belongs to the first reference-signal-resource set only when the operating action is transmitting; and there exists a reference signal resource type that belongs to and only belongs to one of the first reference signal resource type subset or the second reference signal resource type subset.

In one embodiment, a type of any of the M reference signal resources belongs to one of an Uplink reference signal resource, a Downlink reference signal resource, an SBS resource, a CSI-RS resource, a CSI-RS resource set, an SRS resource, an SRS resource set, a periodic reference signal resource, a semi-persistent reference signal resource or an aperiodic reference signal resource.

In one embodiment, the first signaling indicates which of the M reference signal resources comprised in the first reference-signal-resource set.

Embodiment 17

Figure 17:
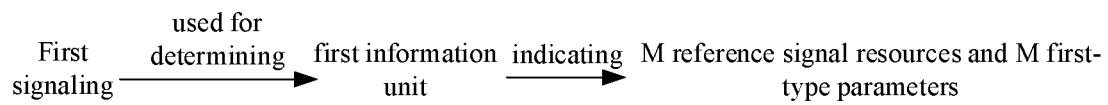
FIG. 17 illustrates a schematic diagram of a first information unit, M reference signal resources and M first-type parameters according to one embodiment of the present disclosure.

Embodiment 17 illustrates a schematic diagram of a first information unit, M reference signal resources and M first-type parameters according to one embodiment of the present disclosure; as shown in FIG. 17. In Embodiment 17, the first signaling is used for determining the first information unit, and the first information unit indicates the M reference signal resources and the M first-type parameters.

In one embodiment, the first signaling is used by the first node for determining the first information unit.

In one embodiment, the first signaling indicates the first information unit.

In one embodiment, the first signaling explicitly indicates the first information unit.

In one embodiment, the first signaling implicitly indicates the first information unit.

In one embodiment, the first signaling indicates a TCI codepoint corresponding to the first information unit.

In one embodiment, the first information unit comprises information in all or part of fields in an IE.

In one embodiment, the first information unit comprises information in all or part of fields in a TCI-State IE.

In one embodiment, the first information unit is a TCI-State IE.

In one embodiment, the specific meaning of the TCI-State IE can be found in 3GPP TS38.331.

In one embodiment, the first information unit comprises a first index, and the first index is used for identifying the first information unit; the first index is a non-negative integer.

In one subembodiment of the above embodiment, the first index is a TCI-StateId.

In one subembodiment of the above embodiment, the first signaling indicates the first index.

In one subembodiment of the above embodiment, the first signaling indicates a TCI codepoint corresponding to the first index.

In one embodiment, the specific meaning of the TCI-StateId can be found in 3GPP TS38.321 and 3GPP TS38.331.

In one embodiment, the first information unit indicates an identifier of each reference signal resource in the M reference signal resources.

In one embodiment, an identifier of any of the M reference signal resource is one of NZP-CSI-RS-ResourceId, NZP-CSI-RS-ResourceSetId, SSB-Index, SRS-ResourceSetId, SRS-ResourceId or panel Id.

In one embodiment, the first information unit indicates a corresponding first-type parameter for each of the M reference signal resources.

Embodiment 18

Figure 18:
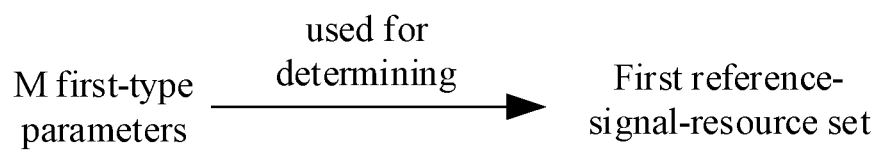
FIG. 18 illustrates a schematic diagram of M first-type parameters being used for determining a first reference-signal-resource set according to one embodiment of the present disclosure.

Embodiment 18 illustrates a schematic diagram of M first-type parameters used for determining a first reference-signal-resource set according to one embodiment of the present disclosure; as shown in FIG. 18. In Embodiment 18, the M first-type parameters are respectively M non-negative integers.

In one embodiment, for any given reference signal resource in the M reference signal resources, if a first-type parameter corresponding to the given reference signal resource belongs to a first value set, the given reference signal resource belongs to the first reference-signal-resource set only when the operating action is receiving; and if the first-type parameter corresponding to the given reference signal resource belongs to a second value set, the given reference signal resource belongs to the first reference-signal-resource set only when the operating action is transmitting; the first value set and the second value set respectively comprise a positive integer number of non-negative integer(s), and there at least exists a non-negative integer that belongs to and only belongs to one of the first value set or the second value set.

In one subembodiment of the above embodiment, there does not exist a non-negative integer that belongs to the first value set and the second value set simultaneously.

In one subembodiment of the above embodiment, there exists a non-negative integer that belongs to the first value set and the second value set simultaneously.

In one embodiment, for any given reference signal resource in the M reference signal resources, if a first-type parameter corresponding to the given reference signal resource is equal to a first value, the given reference signal resource belongs to the first reference-signal-resource set only when the operating action is receiving; and if the first-type parameter corresponding to the given reference signal resource is equal to a second value, the given reference signal resource belongs to the first reference-signal-resource set only when the operating action is transmitting; and the first value is not equal the second value.

Embodiment 19

Figure 19:
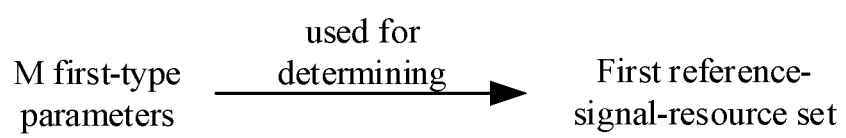
FIG. 19 illustrates a schematic diagram of M first-type parameters being used for determining a first reference-signal-resource set according to one embodiment of the present disclosure.

Embodiment 19 illustrates a schematic diagram of M first-type parameters used for determining a first reference-signal-resource set according to one embodiment of the present disclosure; as shown in FIG. 19. In Embodiment 19, the M first-type parameters are respectively the M associated types in Embodiment 14.

In one embodiment, when the operating action is receiving, the first reference-signal-resource set consists of all reference signal resource(s) of the M reference signal resources whose corresponding first-type parameter(s) belongs(belong) to a first associated type subset; when the operating action is transmitting, the first reference-signal-resource set consists of all reference signal resource(s) of the M reference signal resources whose corresponding first-type parameter(s) belongs(belong) to a second associated type subset; the first associated type subset and the second associated type subset respectively comprise a positive integer number of associated type(s); there at least exists an associated type that belongs to and only belongs to one of the first associated type subset or the second associated type subset.

In one subembodiment of the above embodiment, there does not exist an associated type that belongs to the first associated type subset and the second associated type subset.

In one subembodiment of the above embodiment, there exist an associated type that belongs to the first associated type subset and the second associated type subset simultaneously.

In one subembodiment of the above embodiment, when the operating action is receiving, the first associated type set consists of all associated types in the M first-type parameters that belong to the first associated type subset; when the operating action is receiving, the first associated type set consists of all associated types in the M first-type parameters that belong to the second associated type subset.

Embodiment 20

Figure 20:
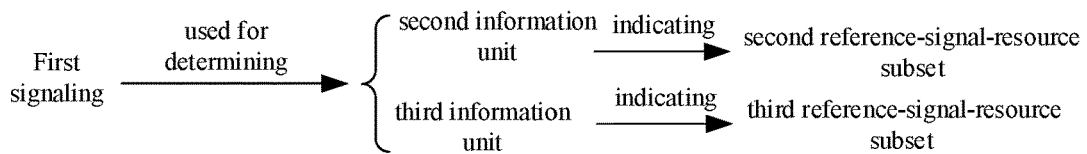
FIG. 20 illustrates a schematic diagram of a second information unit, a second reference-signal-resource subset, a third information unit and a third reference-signal-resource subset according to one embodiment of the present disclosure.

Embodiment 20 illustrates a schematic diagram of a second information unit, a second reference-signal-resource subset, a third information unit and a third reference-signal-resource subset according to one embodiment of the present disclosure; as shown in FIG. 20. In Embodiment 20, the first signaling is used for determining the second information unit and the third information unit; the second information unit indicates the second reference-signal-resource subset, and the third information unit indicates the third reference-signal-resource subset.

In one embodiment, the first signaling is used by the first node for determining the second information unit and the third information unit.

In one embodiment, the first signaling indicates the second information unit and the third information unit.

In one embodiment, the first signaling explicitly indicates the second information unit and the third information unit.

In one embodiment, the first signaling implicitly indicates the second information unit and the third information unit.

In one embodiment, the first signaling indicates a TCI codepoint corresponding to the second information unit and a TCI codepoint corresponding to the third information unit.

In one embodiment, the second information unit and the third information unit correspond to a same TCI codepoint.

In one embodiment, the second information unit comprises information in all or part of fields in an IE.

In one embodiment, the second information unit comprises information in all or part of fields in a TCI-State IE.

In one embodiment, the second information unit is a TCI-State IE.

In one embodiment, the second information unit comprises a second index, and the second index is used for identifying the second information unit; the second index is a non-negative integer.

In one subembodiment of the above embodiment, the second index is a TCI-StateId.

In one embodiment, the second reference-signal-resource subset comprises a positive integer number of reference signal resource(s).

In one embodiment, the second information unit indicates an identifier of each reference signal resource in the second reference-signal-resource subset.

In one embodiment, an identifier of any reference signal resource in the second reference-signal-resource subset is one of NZP-CSI-RS-ResourceId, NZP-CSI-RS-ResourceSetId, SSB-Index, SRS-ResourceSetId, SRS-ResourceId or panel Id.

In one embodiment, the third information unit comprises information in all or part of fields in an IE.

In one embodiment, the third information unit comprises information in all or part of fields in a TCI-State IE.

In one embodiment, the third information unit is a TCI-State IE.

In one embodiment, the third information unit comprises a third index, and the third index is used for identifying the third information unit, and the third index is a non-negative integer.

In one subembodiment of the above embodiment, the third index is a TCI-StateId.

In one embodiment, the third reference-signal-resource subset comprises a positive integer number of reference signal resource(s).

In one embodiment, the third information unit indicates an identifier of each reference signal resource in the third reference-signal-resource subset.

In one embodiment, an identifier of any reference signal resource in the third reference-signal-resource subset is one of NZP-CSI-RS-ResourceId, NZP-CSI-RS-ResourceSetId, SSB-Index, SRS-ResourceSetId, SRS-ResourceId or panel Id.

In one embodiment, the M reference signal resources consist of the second reference-signal-resource subset and the third reference-signal-resource subset.

Embodiment 21

Figure 21:
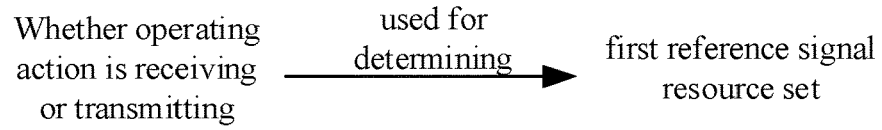
FIG. 21 illustrates a schematic diagram of relations among a first reference-signal-resource set, a second reference-signal-resource subset and a third reference-signal-resource subset according to one embodiment of the present disclosure.

Embodiment 21 illustrates a schematic diagram of relations among a first reference-signal-resource set, a second reference-signal-resource subset and a third reference-signal-resource subset according to one embodiment of the present disclosure; as shown in FIG. 21. In Embodiment 21, whether the operating action is receiving or transmitting is used for determining whether the first reference-signal-resource set only comprises reference signal resources in one of the second reference-signal-resource subset or the third reference-signal-resource subset or comprises reference signal resources in both the second reference-signal-resource subset and the third reference-signal-resource subset.

In one embodiment, when the operating action is receiving, the first reference-signal-resource set comprises reference signal resources in both the second reference-signal-resource subset and the third reference-signal-resource subset.

In one subembodiment of the above embodiment, the first reference-signal-resource set comprises part or all of reference signal resources in the second reference-signal-resource subset.

In one subembodiment of the above embodiment, the first reference-signal-resource set comprises part or all of reference signal resources in the third reference-signal-resource subset.

In one subembodiment of the above embodiment, a reception of the first signal group is related to both the second reference-signal-resource subset and the second reference-signal-resource subset.

In one embodiment, when the operating action is receiving, the first reference-signal-resource set comprises a positive integer number of reference signal resource(s) in only one of the second reference-signal-resource subset or the third reference-signal-resource subset.

In one embodiment, when the operating action is transmitting, the first reference-signal-resource set comprises reference signal resources in both the second reference-signal-resource subset and the third reference-signal-resource subset.

In one embodiment, any reference signal resource in the second reference-signal-resource subset and the third reference-signal-resource subset corresponds to a first-type parameter; when the first reference-signal-resource set comprises reference signal resources in both the second reference-signal-resource subset and the third reference-signal-resource subset, whether the operating action is receiving or transmitting and a first-type parameter corresponding to each reference signal resource in the second reference-signal-resource subset and the third reference-signal-resource subset are used together for determining which reference signal resources in the second reference-signal-resource subset and the third reference-signal-resource subset comprised in the first reference-signal-resource set; when the first reference-signal-resource set comprises reference signal resources in only one reference-signal-resource subset between the second reference-signal-resource subset or the third reference-signal-resource subset, whether the operating action is receiving or transmitting and a first-type parameter corresponding to each reference signal resources in the one reference-signal-resource subset are used together for determining which reference signal resources in the target reference-signal-resource subset comprised in the first reference-signal-resource set.

In one subembodiment of the above embodiment, a first-type parameter corresponding to any reference signal resource in the second reference-signal-resource subset and the third reference-signal-resource subset is a non-negative integer.

In one subembodiment of the above embodiment, a first-type parameter corresponding to any reference signal resource in the second reference-signal-resource subset and the third reference-signal-resource subset is one of the M associated types in Embodiment 14.

In one subembodiment of the above embodiment, the second information unit indicates a first-type parameter corresponding to each reference signal resource in the second reference-signal-resource subset, and the third information unit indicates a first-type parameter corresponding to each reference signal resource in the third reference-signal-resource subset.

Embodiment 22

Figure 22:
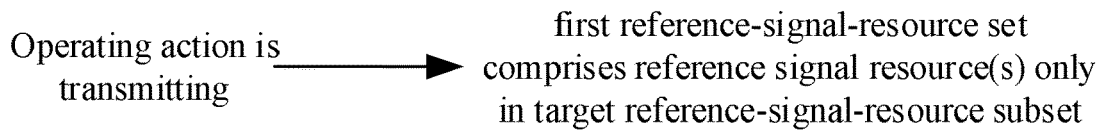
FIG. 22 illustrates a schematic diagram of relations among a first reference-signal-resource set, a second reference-signal-resource subset and a third reference-signal-resource subset according to one embodiment of the present disclosure.

Embodiment 22 illustrates a schematic diagram of relations among a first reference-signal-resource set, a second reference-signal-resource subset and a third reference-signal-resource subset according to one embodiment of the present disclosure; as shown in FIG. 22. In Embodiment 22, when the operating action is transmitting, the first reference-signal-resource set comprises reference signal resources in only a target reference-signal-resource subset in the second reference-signal-resource subset and the third reference-signal-resource subset.

In one embodiment, if the operating action is transmitting, the first reference-signal-resource set comprises reference signal resources in only a target reference-signal-resource subset in the second reference-signal-resource subset and the third reference-signal-resource subset.

In one embodiment, when the operating action is transmitting, the first reference-signal-resource set comprises all or part of reference signal resources in the target reference-signal-resource subset.

In one embodiment, the target reference-signal-resource subset is the second reference-signal-resource subset or the third reference-signal-resource subset.

In one embodiment, a type of a reference signal resource comprised in the second reference-signal-resource subset and a type of a reference signal resource comprised in the third reference-signal-resource subset are used for determining the target reference-signal-resource subset.

In one embodiment, the target reference-signal-resource subset is a reference-signal-resource subset comprising an SRS resource in the second reference-signal-resource subset and the third reference-signal-resource subset.

In one embodiment, the target reference-signal-resource subset comprises an SRS resource.

In one embodiment, a target information unit is an information unit in the second information unit and the third information unit that indicates the target reference-signal-resource subset.

In one subembodiment of the above embodiment, an index of the target information unit in the second information unit and the third information unit is less than an index of an information unit in the second information unit and the third information unit that is different from the target information unit.

In one subembodiment of the above embodiment, the target information unit is a first information unit in the second information unit and the third information unit.

In one subembodiment of the above embodiment, an index of the target information unit in the second information unit and the third information unit is greater than an index of an information unit in the second information unit and the third information unit that is different from the target information unit.

In one subembodiment of the above embodiment, the first signaling is used for determining the target information unit out of the second information unit and the third information unit.

In one subembodiment of the above embodiment, the first signaling explicitly indicates the target information unit out of the second information unit and the third information unit.

In one subembodiment of the above embodiment, the first signaling implicitly indicates the target information unit out of the second information unit and the third information unit.

In one subembodiment of the above embodiment, time-frequency resources occupied by the first signaling are used for determining the target information unit out of the second information unit and the third information unit.

In one embodiment, when the operating action is transmitting, a transmission of the first signal group is unrelated to a reference-signal-resource subset in the second reference-signal-resource subset and the third reference-signal-resource subset that is different from the target reference-signal-resource subset.

Embodiment 23

Figure 23:
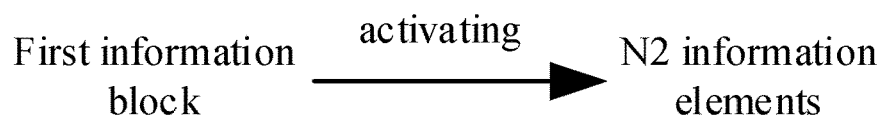
FIG. 23 illustrates a schematic diagram of a first information block activating N2 information units according to one embodiment of the present disclosure.

Embodiment 23 illustrates a schematic diagram of a first information block activating N2 information units according to one embodiment of the present disclosure; as shown in FIG. 23.

In one embodiment, the first information block is carried by a higher-layer signaling.

In one embodiment, the first information block is carried by an RRC signaling.

In one embodiment, the first information block is carried by a MAC CE signaling.

In one embodiment, the first information block comprises a MAC CE.

In one embodiment, the first information block comprises a MAC CE for activation/deactivation of physical shared channel TCI state.

In one subembodiment of the above embodiment, the physical shared channel comprises a PDSCH.

In one subembodiment of the above embodiment, the physical shared channel comprises a PUSCH.

In one embodiment, the first information block is transmitted on a Downlink.

In one embodiment, the first information block is transmitted on a SideLink.

In one embodiment, the first information block indicates a TCI codepoint corresponding to any of the N2 information units.

In one embodiment, any of the N1 information units comprises information in all or part of fields in an IE.

In one embodiment, any of the N1 information units comprises information in all or part of fields in a TCI-State IE.

In one embodiment, any of the N1 information units is a TCI-State IE.

In one embodiment, the N1 information units are configured by a higher-layer signaling.

In one embodiment, the N1 information units are configured by an RRC signaling.

In one embodiment, the first information unit is one of the N2 information units.

In one embodiment, the second information unit and the third information unit are respectively one of the N2 information units.

In one embodiment, the N2 is no greater than 8.

In one embodiment, the N2 is greater than 8.

In one embodiment, the second information unit is one of N3 information units, and the third information unit is one of N4 information units; the N3 information units and the N4 information units are respectively subsets of the N2 information units; and N3 and N4 are respectively positive integers no greater than the N2 and greater than 1.

In one subembodiment of the above embodiment, any of the N3 information units is different from any of the N4 information units.

In one subembodiment of the above embodiment, the N3 is no greater than 8, and the N4 is no greater than 8.

In one subembodiment of the above embodiment, the N2 is equal to a sum of the N3 and the N4.

In one subembodiment of the above embodiment, the first information block comprises a first information sub-block and a second information sub-block, the first information sub-block is used for activating the N3 information units, and the second information sub-block is used for activating the N4 information units, the first information sub-block and the second information sub-block respectively comprise a MAC CE for activation/deactivation of physical shared channel TCI state, and the first information sub-block and the second information sub-block are respectively transmitted on two PDSCHs.

Embodiment 24

Figure 24:
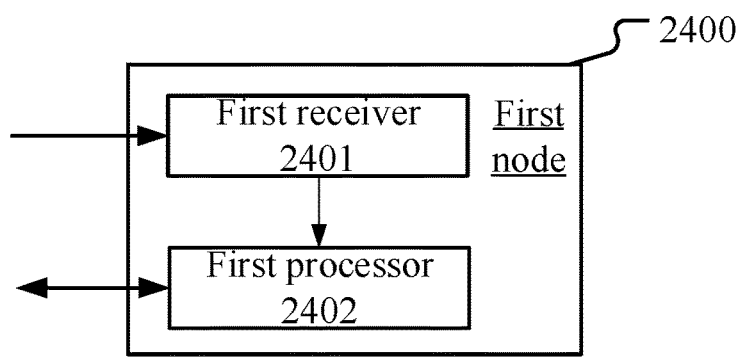
FIG. 24 illustrates a structure block diagram of a processing device in a first node according to one embodiment of the present disclosure.

Embodiment 24 illustrates a structure block diagram of a processing device in a first node according to one embodiment of the present disclosure; as shown in FIG. 24. In FIG. 24, the first node's processing device 2400 comprises a first receiver 2401 and a first processor 2402.

In Embodiment 24, the first receiver 2401 receives a first signaling; and the first processor 2402 operates a first signal group.

In Embodiment 24, the first signal group comprises a positive integer number of signal(s); the first signaling comprises scheduling information of the first signal group; the first signaling is used for determining a first reference-signal-resource set; a first parameter-group set comprises a positive integer number of parameter group(s), any parameter group in the first parameter-group set is used for the operating action of a signal in the first signal group; any reference signal resource in the first reference-signal-resource set is used for determining a parameter group in the first parameter-group set; any parameter group in the first parameter-group set comprises one or more types of K types of candidate parameters, K being a positive integer greater than 1; the operating action is receiving or transmitting; which type(s) of the K types of candidate parameters comprised by any parameter group in the first parameter-group set is related to whether the operating action is receiving or transmitting.

In one embodiment, a first associated type set comprises a positive integer number of associated type(s); any reference signal resource in the first reference-signal-resource set corresponds to one associated type in the first associated type set; a target reference signal resource is any reference signal resource in the first reference-signal-resource set; the target reference signal resource is used for determining a target parameter group in the first parameter-group set, and the target reference signal resource corresponds to a target associated type in the first associated type set; which type(s) of the K types of candidate parameters comprised by the target parameter group is related to the target associated type.

In one embodiment, the first signaling is used for determining M reference signal resources, M being a positive integer greater than 1; the first reference-signal-resource set is a subset of the M reference signal resources; and the first reference-signal-resource set is related to whether the operating action is receiving or transmitting.

In one embodiment, the first signaling is used for determining a first information unit, and the first information unit indicates the M reference signal resources and M first-type parameters; the M reference signal resources respectively correspond to the M first-type parameters; whether the operating action is receiving or transmitting and the M first-type parameters are used together for determining the first reference-signal-resource set out of the M reference signal resources.

In one embodiment, the first signaling is used for determining a second information unit and a third information unit; the second information unit indicates a second reference-signal-resource subset, and the third information unit indicates a third reference-signal-resource subset; the M reference signal resources comprise the second reference-signal-resource subset and the third reference-signal-resource subset; whether the first reference-signal-resource set comprises reference signal resource(s) in one or both of the second reference-signal-resource subset and the third reference-signal-resource subset is related to the whether the operating action is receiving or transmitting.

In one embodiment, when the operating action is transmitting, the first reference-signal-resource set comprises reference signal resource(s) in only a target reference-signal-resource subset in the second reference-signal-resource subset and the third reference-signal-resource subset.

In one embodiment, the first receiver 2401 receives a first information block; herein, the first information block is used for activating N2 information units out of N1 information units, N1 and N2 are respectively positive integers greater than 1, and N2 is no greater than N1; any of the N2 information units indicates a positive integer number of reference signal resource(s), and any reference signal resource in the first reference-signal-resource set is a reference signal resource indicated by one of the N2 information units.

In one embodiment, the first processor 2402 receives the first reference signal in Embodiment 5.

In one embodiment, the first processor 2402 transmits the first reference signal in Embodiment 5.

In one embodiment, the first processor 2402 receives the M2 reference signal(s) in Embodiment 5.

In one embodiment, the first processor 2402 transmits the M3 reference signal(s) in Embodiment 5.

In one embodiment, the first node is a UE.

In one embodiment, the first node is a relay node.

In one embodiment, the first receiver 2401 comprises at least one of the antenna 452, the receiver 454, the receiving processor 456, the multi-antenna receiving processor 458, the controller/processor 459, the memory 460, or the data source 467 in Embodiment 4.

In one embodiment, the first processor 2402 comprises at least one of the antenna 452, the transmitter/receiver 454, the transmitting processor 468, the receiving processor 456, the multi-antenna transmitting processor 457, the multi-antenna receiving processor 458, the controller/processor 459, the memory 460 or the data source 467 in Embodiment 4.

Embodiment 25

Figure 25:
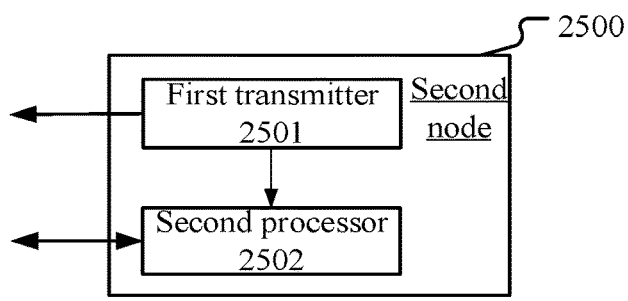
FIG. 25 illustrates a structure block diagram of a processing device in a second node according to one embodiment of the present disclosure.

Embodiment 25 illustrates a structure block diagram of a processing device in a second node according to one embodiment of the present disclosure; as shown in FIG. 25. In FIG. 25, the second node's processing device 2500 comprises a first transmitter 2501 and a second processor 2502.

In Embodiment 25, the first transmitter 2501 transmits a first signaling; and the second processor 2502 executes a first signal group.

In Embodiment 25, the first signal group comprises a positive integer number of signal(s); the first signaling comprises scheduling information of the first signal group; the first signaling is used for determining a first reference-signal-resource set; a first parameter-group set comprises a positive integer number of parameter group(s), any parameter group in the first parameter-group set is used for an operating action of a signal in the first signal group; the executing action is receiving or transmitting; when the executing action is receiving, the operating action is transmitting; when the executing action is transmitting, the operating action is receiving; any reference signal resource in the first reference-signal-resource set is used for determining a parameter group in the first parameter-group set; any parameter group in the first parameter-group set comprises one or more types of K types of candidate parameters, K being a positive integer greater than 1; which type(s) of the K types of candidate parameters comprised by any parameter group in the first parameter-group set is related to whether the operating action is receiving or transmitting.

In one embodiment, a first associated type set comprises a positive integer number of associated type(s); any reference signal resource in the first reference-signal-resource set corresponds to one associated type in the first associated type set; a target reference signal resource is any reference signal resource in the first reference-signal-resource set; the target reference signal resource is used for determining a target parameter group in the first parameter-group set, and the target reference signal resource corresponds to a target associated type in the first associated type set; which type(s) of the K types of candidate parameters comprised by the target parameter group is related to the target associated type.

In one embodiment, the first signaling is used for determining M reference signal resources, M being a positive integer greater than 1; the first reference-signal-resource set is a subset of the M reference signal resources; and the first reference-signal-resource set is related to whether the operating action is receiving or transmitting.

In one embodiment, the first signaling is used for determining a first information unit, and the first information unit indicates the M reference signal resources and M first-type parameters; the M reference signal resources respectively correspond to the M first-type parameters; whether the operating action is receiving or transmitting and the M first-type parameters are used together for determining the first reference-signal-resource set out of the M reference signal resources.

In one embodiment, the first signaling is used for determining a second information unit and a third information unit; the second information unit indicates a second reference-signal-resource subset, and the third information unit indicates a third reference-signal-resource subset; the M reference signal resources comprise the second reference-signal-resource subset and the third reference-signal-resource subset; whether the first reference-signal-resource set comprises reference signal resource(s) in one or both of the second reference-signal-resource subset and the third reference-signal-resource subset is related to the whether the operating action is receiving or transmitting.

In one embodiment, when the operating action is transmitting, the first reference-signal-resource set comprises reference signal resource(s) in only a target reference-signal-resource subset in the second reference-signal-resource subset and the third reference-signal-resource subset.

In one embodiment, the first transmitter 2501 transmits a first information block; herein, the first information block is used for activating N2 information units out of N1 information units, N1 and N2 are respectively positive integers greater than 1, and N2 is no greater than N1; any of the N2 information units indicates a positive integer number of reference signal resource(s), and any reference signal resource in the first reference-signal-resource set is a reference signal resource indicated by one of the N2 information units.

In one embodiment, the second node is a base station.

In one embodiment, the second node is a UE.

In one embodiment, the second node is a relay node.

In one embodiment, the second processor 2502 transmits the first reference signal in Embodiment 5.

In one embodiment, the second processor 2502 receives the first reference signal in Embodiment 5.

In one embodiment, the second processor 2502 transmits the M2 reference signal(s) in Embodiment 5.

In one embodiment, the second processor 2502 receives the M3 reference signal(s) in Embodiment 5.

In one embodiment, the first transmitter 2501 comprises at least one of the antenna 420, the transmitter 418, the transmitting processor 416, the multi-antenna transmitting processor 471, the controller/processor 475, or the memory 476 in Embodiment 4.

In one embodiment, the second processor 2502 comprises at least one of the antenna 420, the transmitter/receiver 418, the transmitting processor 416, the receiving processor 470, the multi-antenna transmitting processor 471, the multi-antenna receiving processor 472, the controller/processor 475 or memory 476 in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:
1. A first node for wireless communications, comprising:
a first receiver, receiving a first signaling; and
a first processor, performing an operating action on a first signal group; wherein:
the first signal group consists of one signal;
the first signaling comprises scheduling information of the first signal group;
the first node determines a first reference-signal-resource set based on the first signaling;
a first parameter-group set comprises a positive integer number of parameter group(s);
wherein:
when the first reference-signal-resource set consists of a first reference signal resource:
the first parameter-group set consists of a first parameter group; and
the first node determines the first parameter group based on the first reference signal resource;
wherein:
when the first reference-signal-resource set comprises M1 reference signal resources:
the first parameter-group set comprises M1 parameter groups with M1 being a positive integer greater than 1; and
the first node respectively determines the M1 parameter groups based on the M1 reference signal resources;
wherein:
each parameter group in the first parameter-group set is used for the operating action;
the operating action is receiving or transmitting; and
each parameter group in the first parameter-group set comprises one or more types out of K types of candidate parameters, K being a positive integer greater than 1;
wherein:
when the operating action is receiving, the first node receives the first signal group on a Physical Downlink Shared Channel (PDSCH);
when the operating action is transmitting, the first node transmits the first signal group on a Physical Uplink Shared Channel (PUSCH);
each parameter group in the first parameter-group set comprises one or more types out of the K types of candidate parameters related to whether the operating action is receiving or transmitting;
the first signaling indicates a first information unit;
the first information unit indicates M reference signal resources and M associated types, M being a positive integer greater than 1;
the first reference-signal-resource set is a subset of the M reference signal resources;
the M reference signal resources respectively correspond to the M associated types;
each of the M associated types is one of P candidate associated types with P being a positive integer greater than 1;
the P candidate associated types comprise QCL-TypeA, QCL-TypeB, QCL-TypeC and QCL-TypeD; and
the first node determines the first reference-signal-resource set out of the M reference signal resources based on the M associated types and whether the operating action is receiving or transmitting;
the first information unitis a TCI-State IE, the first signaling comprises DCI; a first field in the first signaling indicates a first TCI codepoint out of Q candidate TCI codepoints, Q being a positive integer greater than 1; the Q candidate TCI codepoints respectively correspond to Q information unit sets; a first information unit set is one of the Q information unit set that corresponds to the first TCI codepoint, the first information unit set consists of the first information unit; and the Q information unit sets are the same regardless whether of the operating action is receiving or transmitting.

2. The first node according to claim 1, wherein:
a first associated type set comprises a positive integer number of associated type(s);
each reference signal resource in the first reference-signal-resource set corresponds to one associated type in the first associated type set;
a target reference signal resource is one reference signal resource in the first reference-signal-resource set;
the target reference signal resource is used for determining a target parameter group in the first parameter-group set, and the target reference signal resource corresponds to a target associated type in the first associated type set; and
the target parameter group comprises one or more types out of the K types of candidate parameters related to the target associated type.

3. The first node according to claim 1, wherein:
when the operating action is receiving, the first reference-signal-resource set consists of reference signal resource(s) of the M reference signal resources corresponding to associated type(s) belonging to a first associated type subset;
when the operating action is transmitting, the first reference-signal-resource set consists of reference signal resource(s) of the M reference signal resources corresponding to associated type(s) belonging to a second associated type subset;
the first associated type subset and the second associated type subset respectively comprise a positive integer number of associated type(s);

at least one of the associated types exclusively belongs to the first associated type subset or the second associated type subset.

4. The first node according to claim 3, wherein an associated type belongs to both the first associated type subset and the second associated type subset.

5. The first node according to claim 1, wherein any of the Q information unit sets comprises one information unit, corresponding relations among the Q candidate TCI codepoints and the Q information unit sets are configured by a MAC CE signaling, the corresponding relations among the Q candidate TCI codepoints and the Q information unit sets are applicable regardless whether the operating action is receiving or transmitting.

6. The first node according to claim 1, wherein:
when the operating action involves receiving:
a given parameter group is any parameter group in the first parameter-group set;
the given parameter group is used for a reception of the first signal group;
a given reference signal resource in the first reference-signal-resource set is used for determining the given parameter group;
the given reference signal resource is reserved for a given reference signal;
the given parameter group comprises large-scale properties;
the large-scale properties include one or more of delay spread, Doppler spread, Doppler shift, average delay, and Spatial Rx parameters; and
all or part of large-scale properties of a channel that the given reference signal goes through are used for inferring all or part of large-scale properties of a channel that the first signal group goes through; and
when the operating action involves transmitting:
a given parameter group is any parameter group in the first parameter-group set;
the given parameter group is used for a transmission of the first signal group;
a given reference signal resource in the first reference-signal-resource set is used for determining the given parameter group;
the given reference signal resource is reserved for a given reference signal;
the given parameter group comprises a spatial-domain filter; and
the first node employs a same spatial-domain filter for transmitting the first signal group and receiving the given reference signal.

7. A second node for wireless communications, comprising:
a first transmitter, transmitting a first signaling; and
a second processor, performing an executing action on a first signal group;
wherein:
the first signal group consists of one signal;
the first signaling comprises scheduling information of the first signal group;
the first signaling is used for determining a first reference-signal-resource set; and
a first parameter-group set comprises a positive integer number of parameter group(s);
wherein:
when the first reference-signal-resource set consists of a first reference signal resource, the first parameter-group set consists of a first parameter group, and the first reference signal resource is used for determining the first parameter group; and
when the first reference-signal-resource set comprises M1 reference signal resources, a first parameter-group set comprises M1 parameter groups with M1 being a positive integer greater than 1, and the M1 reference signal resources are respectively used for determining the M1 parameter groups;
wherein:
each parameter group in the first parameter-group set is used for an operating action of the first signal group; and
the executing action is receiving or transmitting;
wherein:
when the executing action is receiving, the operating action is transmitting, and a target receiver of the first signaling transmits the first signal group on a PUSCH;
when the executing action is transmitting, the operating action is receiving, and a target receiver of the first signaling receives the first signal group on a PDSCH;
each parameter group in the first parameter-group set comprises one or more types of K types of candidate parameters, K being a positive integer greater than 1;
each parameter group in the first parameter-group set comprises one or more types out of the K types of candidate parameters related to whether the operating action is receiving or transmitting;
the first signaling indicates a first information unit;
the first information unit indicates M reference signal resources and M associated types, M being a positive integer greater than 1;
the first reference-signal-resource set is a subset of the M reference signal resources;
the M reference signal resources respectively correspond to the M associated types;
each one of the M associated types is one of P candidate associated types with P being a positive integer greater than 1, the P candidate associated types comprise QCL-TypeA, QCL-TypeB, QCL-TypeC and QCL-TypeD; and
whether the operating action is receiving or transmitting and the M associated types are used together for determining the first reference-signal-resource set out of the M reference signal resources;
the first information unit is a TCI-State IE, the first signaling comprises DCI; a first field in the first signaling indicates a first TCI codepoint out of Q candidate TCI codepoints, Q being a positive integer greater than 1; the Q candidate TCI codepoints respectively correspond to Q information unit sets; a first information unit set is one of the Q information unit set that corresponds to the first TCI codepoint, the first information unit set consists of the first information unit; and
the Q information unit sets are the same regardless of whether the operating action is receiving or transmitting.

8. The second node according to claim 7, wherein a first associated type set comprises a positive integer number of associated type(s);
each reference signal resource in the first reference-signal-resource set corresponds to one associated type in the first associated type set;
a target reference signal resource is any reference signal resource in the first reference-signal-resource set;

the target reference signal resource is used for determining a target parameter group in the first parameter-group set;

the target reference signal resource corresponds to a target associated type in the first associated type set; and the target parameter group comprises one or more types of the K types of candidate parameters related to the target associated type.

9. The second node according to claim 7, wherein:

when the operating action is receiving, the first reference-signal-resource set consists of reference signal resource(s) of the M reference signal resources corresponding to associated type(s) belonging to a first associated type subset;

when the operating action is transmitting, the first reference-signal-resource set consists of reference signal resource(s) of the M reference signal resources corresponding to associated type(s) belonging to a second associated type subset;

the first associated type subset and the second associated type subset respectively comprise a positive integer number of associated type(s); and at least one of the associated types exclusively belongs to the first associated type subset or the second associated type subset, and an associated type belongs to both the first associated type subset and the second associated type subset.

10. The second node according to claim 7, wherein any of the Q information unit sets comprises one information unit, corresponding relations among the Q candidate TCI codepoints and the Q information unit sets are configured by a MAC CE signaling, the corresponding relations among the Q candidate TCI codepoints and the Q information unit sets are applicable regardless whether the operating action is receiving or transmitting.

11. The second node according to claim 7, wherein:

when the operating action involves receiving;

a given parameter group is any parameter group in the first parameter-group set, the given parameter group is used for a reception of the first signal group, and a given reference signal resource in the first reference-signal-resource set is used for determining the given parameter group;

the given reference signal resource is reserved for a given reference signal;

the given parameter group comprises large-scale properties;

the large-scale properties include one or more of delay spread, Doppler spread, Doppler shift, average delay, and Spatial Rx parameters; and all or part of large-scale properties of a channel that the given reference signal goes through are used for inferring all or part of large-scale properties of a channel that the first signal group goes through;

when the operating action involves transmitting:

a given parameter group is any parameter group in the first parameter-group set, the given parameter group is used for a transmission of the first signal group;

a given reference signal resource in the first reference-signal-resource set is used for determining the given parameter group;

the given reference signal resource is reserved for a given reference signal;

the given parameter group comprises a spatial-domain filter; and a transmitter of the first signal group employs a same spatial-domain filter for transmitting the first signal group and receiving the given reference signal.

12. A method in a first node for wireless communications, comprising:

receiving a first signaling; and performing an operating action on a first signal group;

wherein:

the first signal group comprises only one signal;

the first signaling comprises scheduling information of the first signal group;

the first signaling is used for determining a first reference-signal-resource set;

a first parameter-group set comprises a positive integer number of parameter group(s);

wherein when the first reference-signal-resource set consists of a first reference signal resource:

the first parameter-group set consists of a first parameter group, and the first reference signal resource is used for determining the first parameter group;

wherein when the first reference-signal-resource set comprises M1 reference signal resources:

a first parameter-group set comprises M1 parameter groups with M1 being a positive integer greater than 1; and the M1 reference signal resources are respectively used for determining the M1 parameter groups;

wherein:

each parameter group in the first parameter-group set is used for the operating action; the operating action is receiving or transmitting; and each parameter group in the first parameter-group set comprises one or more types out of K types of candidate parameters, K being a positive integer greater than 1;

wherein:

when the operating action is receiving, the first node receives the first signal group on a PDSCH; and when the operating action is transmitting, the first node transmits the first signal group on a PUSCH; and wherein:

each parameter group in the first parameter-group set comprises one or more types out of the K types of candidate parameters related to whether the operating action is receiving or transmitting;

the first signaling indicates a first information unit;

the first information unit indicates M reference signal resources and M associated types, M being a positive integer greater than 1;

the first reference-signal-resource set is a subset of the M reference signal resources;

the M reference signal resources respectively correspond to the M associated types;

each of the M associated types is one of P candidate associated types with P being a positive integer greater than 1;

the P candidate associated types comprise QCL-TypeA, QCL-TypeB, QCL-TypeC and QCL-TypeD; and whether the operating action is receiving or transmitting and the M associated types are used together for determining the first reference-signal-resource set out of the M reference signal resources;

the first information unitis a TCI-State IE, the first signaling comprises DCI; a firstfield in the first signaling indicates a first TCI codepoint out of Q candidate TCI codepoints, Q being a positive integer greater than 1;

the Q candidate TCI codepoints respectively correspond to Q information unit sets; a first information unit set is one of the Q information unit set that corresponds to the first TCI codepoint, the first information unit set consists of the first information unit; and the Q information unit sets are the same regardless of whether the operating action is receiving or transmitting.

13. The method according to claim 12, wherein:
when the operating action is receiving, the first reference-signal-resource set consists of reference signal resource(s) of the M reference signal resources corresponding to associated type(s) belonging to a first associated type subset;
when the operating action is transmitting, the first reference-signal-resource set consists of reference signal resource(s) of the M reference signal resources corresponding to associated type(s) belonging to a second associated type subset;
the first associated type subset and the second associated type subset respectively comprise a positive integer number of associated type(s); and
at least one of the associated types exclusively belongs to the first associated type subset or the second associated type subset.

14. The method according to claim 13, wherein an associated type belongs to both the first associated type subset and the second associated type subset.

15. The method according to claim 12, wherein any of the Q information unit sets comprises one information unit, corresponding relations among the Q candidate TCI codepoints and the Q information unit sets are configured by a MAC CE signaling, the corresponding relations among the Q candidate TCI codepoints and the Q information unit sets are applicable regardless whether the operating action is receiving or transmitting.

16. The method according to claim 12, wherein:
when the operating action involves receiving:
a given parameter group is any parameter group in the first parameter-group set;
the given parameter group is used for a reception of the first signal group;
a given reference signal resource in the first reference-signal-resource set is used for determining the given parameter group;
the given reference signal resource is reserved for a given reference signal;
the given parameter group comprises large-scale properties;
the large-scale properties include one or more of delay spread, Doppler spread, Doppler shift, average delay, and Spatial Rx parameters; and
all or part of large-scale properties of a channel that the given reference signal goes through are used for inferring all or part of large-scale properties of a channel that the first signal group goes through; and
when the operating action involves transmitting:
a given parameter group is any parameter group in the first parameter-group set,
the given parameter group is used for a transmission of the first signal group;
a given reference signal resource in the first reference-signal-resource set is used for determining the given parameter group;
the given reference signal resource is reserved for a given reference signal;

the given parameter group comprises a spatial-domain filter; and
the first node employs a same spatial-domain filter for transmitting the first signal group and receiving the given reference signal.

17. A method in a second node for wireless communications, comprising:
transmitting a first signaling; and
performing an executing action on a first signal group;
wherein:
the first signal group consists of one signal;
the first signaling comprises scheduling information of the first signal group;
the first signaling is used for determining a first reference-signal-resource set; and
a first parameter-group set comprises a positive integer number of parameter group(s);
wherein:
when the first reference-signal-resource set consists of a first reference signal resource, the first parameter-group set consists of a first parameter group, and the first reference signal resource is used for determining the first parameter group; and
when the first reference-signal-resource set comprises M1 reference signal resources, a first parameter-group set comprises M1 parameter groups with M1 being a positive integer greater than 1, and the M1 reference signal resources are respectively used for determining the M1 parameter groups;
wherein:
each parameter group in the first parameter-group set is used for an operating action of the first signal group; and
the executing action is receiving or transmitting;
wherein:
when the executing action is receiving, the operating action is transmitting, and a target receiver of the first signaling transmits the first signal group on a PUSCH;
when the executing action is transmitting, the operating action is receiving, and a target receiver of the first signaling receives the first signal group on a PDSCH;
each parameter group in the first parameter-group set comprises one or more types of K types of candidate parameters, K being a positive integer greater than 1;
each parameter group in the first parameter-group set comprises one or more types out of the K types of candidate parameters related to whether the operating action is receiving or transmitting;
the first signaling indicates a first information unit;
the first information unit indicates M reference signal resources and M associated types, M being a positive integer greater than 1;
the first reference-signal-resource set is a subset of the M reference signal resources;
the M reference signal resources respectively correspond to the M associated types;
each one of the M associated types is one of P candidate associated types with P being a positive integer greater than 1,
the P candidate associated types comprise QCL-TypeA, QCL-TypeB, QCL-TypeC and QCL-TypeD; and
whether the operating action is receiving or transmitting and the M associated types are used together for determining the first reference-signal-resource set out of the M reference signal resources;
the first information unit is a TCI-State IE, the first signaling comprises DCI; a first field in the first signaling indicates a first TCI codepoint out of Q candidate TCI codepoints, Q being a positive integer greater than 1; the Q candidate TCI codepoints respectively correspond to Q information unit sets; a first information unit set is one of the Q information unit set that corresponds to the first TCI codepoint, the first information unit set consists of the first information unit and the Q information unit sets are the same regardless of whether the operating action is receiving or transmitting.

18. The method according to claim 17, wherein:
when the operating action is receiving, the first reference-signal-resource set consists of reference signal resource(s) of the M reference signal resources corresponding to associated type(s) belonging to a first associated type subset;
when the operating action is transmitting, the first reference-signal-resource set consists of reference signal resource(s) of the M reference signal resources corresponding to associated type(s) belonging to a second associated type subset;
the first associated type subset and the second associated type subset respectively comprise a positive integer number of associated type(s); and
at least one of the associated types exclusively belongs to the first associated type subset or the second associated type subset, and an associated type belongs to both the first associated type subset and the second associated type subset.

19. The method according to claim 17, wherein any of the Q information unit sets comprises one information unit, corresponding relations among the Q candidate TCI codepoints and the Q information unit sets are configured by a MAC CE signaling, the corresponding relations among the Q candidate TCI codepoints and the Q information unit sets are applicable regardless whether the operating action is receiving or transmitting.

20. The method according to claim 17, wherein:
when the operating action involves receiving;
a given parameter group is any parameter group in the first parameter-group set, the given parameter group is used for a reception of the first signal group, and a given reference signal resource in the first reference-signal-resource set is used for determining the given parameter group;
the given reference signal resource is reserved for a given reference signal;
the given parameter group comprises large-scale properties;
the large-scale properties include one or more of delay spread, Doppler spread, Doppler shift, average delay, and Spatial Rx parameters; and
all or part of large-scale properties of a channel that the given reference signal goes through are used for inferring all or part of large-scale properties of a channel that the first signal group goes through;
when the operating action involves transmitting:
a given parameter group is any parameter group in the first parameter-group set,
the given parameter group is used for a transmission of the first signal group;
a given reference signal resource in the first reference-signal-resource set is used for determining the given parameter group;
the given reference signal resource is reserved for a given reference signal;
the given parameter group comprises a spatial-domain filter; and
a transmitter of the first signal group employs a same spatial-domain filter for transmitting the first signal group and receiving the given reference signal.

* * * * *